(12) United States Patent
Hale et al.

(10) Patent No.: US 6,252,540 B1
(45) Date of Patent: Jun. 26, 2001

(54) APPARATUS AND METHOD FOR TWO STAGE HYBRID SPACE-TIME ADAPTIVE PROCESSING IN RADAR AND COMMUNICATION SYSTEMS

(75) Inventors: Todd B. Hale, Bellbrook, OH (US); Michael C. Wicks, Utica; Raviraj S. Adve, Syracuse, both of NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/468,044

(22) Filed: Dec. 21, 1999

(51) Int. Cl.[7] .................................................. G01S 7/292
(52) U.S. Cl. ........................... 342/159; 342/162; 342/93; 342/192; 342/195; 342/196
(58) Field of Search ................... 342/89, 90, 93, 342/159, 160, 161, 162, 163, 165, 173, 174, 192, 195, 196, 203

(56) References Cited

U.S. PATENT DOCUMENTS

| | | | | |
|---|---|---|---|---|
| 4,686,532 | * | 8/1987 | McAulay | 342/195 |
| 4,783,744 | * | 11/1988 | Yueh | 701/221 |
| 4,807,158 | * | 2/1989 | Blanton et al. | 345/425 |
| 5,253,823 | * | 10/1993 | Lawrence | 244/3.15 |
| 5,748,143 | * | 5/1998 | Melvin, Jr. et al. | 342/162 |
| 5,907,302 | * | 5/1999 | Melvin, Jr. et al. | 342/162 |
| 6,091,361 | * | 7/2000 | Davis et al. | 342/378 |

OTHER PUBLICATIONS

"Design and performance evaluation of a portable parallel library for space–time adaptive processing", Lebak, J.M.; Bojanczyk, A.W., Parallel and Distributed Systems, IEEE Transactions on, vol.: 11 Issue: 3, Mar. 2000, pp. 287–298.*

"Ground moving target indication using knowledge based space time adaptive processing", Adve, R.S.; Wicks, M.C.; Hale, T.B.; Antonik, P., Radar Conference, 2000. The Record of the IEEE 2000 International, 2000, pp. 735–740.*

"Effects of clutter modeling in evaluating STAP processing for space–based radars", Maher, J.; Callahan, M.; Lynch, D., Radar Conference, 2000. The Record of the IEEE 2000 International, 2000, pp. 565–570.*

"CFAR dectection and estimation for STAP radar", Reed, I.S.; Gau, Y.L.; Truong, T.K., Aerospace and Electronic Systems, IEEE Transactions on , vol. 34 Issue: 3, Jul. 1998, pp. 722–735.*

* cited by examiner

*Primary Examiner*—John B. Sotomayor
(74) *Attorney, Agent, or Firm*—Harold L. Burnstyn

(57) ABSTRACT

A Two-Stage Hybrid algorithm offers significant improvement in the false alarm rate and detection performance of Space-Time Adaptive Processing in non-homogeneous environments for both radar and digital communications. The first stage analyzes data from a range cell of interest by direct data domain processing, suppressing discrete interferers within the range cell of interest. The second stage implements a purely statistical STAP algorithm, preferably an enhanced version of the Joint-Domain Localized ("JDL") statistical algorithm. For radar this second stage estimates the interference within the range cell of interest from the surrounding range cells. For a communications system, the second stage estimates the covariance matrix of the interference from the entire data block. For both radar and communications, an adaptive filter that suppresses the interference is generated from the estimate by second-order statistics. The present invention is the first two-dimensional STAP technique; all prior-art is one-dimensional.

20 Claims, 20 Drawing Sheets

170

Ideal Transform to Angle-Doppler space: the 2D DFT

390

APPARATUS AND METHOD FOR TWO STAGE HYBRID SPACE-TIME ADAPTIVE PROCESSING IN RADAR AND COMMUNICATION SYSTEMS

STATEMENT OF GOVERNMENT INTEREST

The invention described herein may be manufactured and used by or for the Government for governmental purposes without the payment of any royalty thereon.

BACKGROUND OF THE INVENTION

The present invention relates to suppressing dynamic interference in radar and digital communications systems, and, in particular, relates to two-dimensional adaptive processing techniques applied to such systems. Interference is defined as clutter, jamming, or any other form of unwanted electromagnetic energy that can mask a desired target. Clutter is further defined as unwanted backscatter from the earth's surface and atmosphere or moving objects in either realm.

The growth of wireless communications is rapidly turning the communications spectrum into an environment of dynamic interference, much of it severe. The typical wireless receiver in a large city must contend with hundreds, perhaps thousands, of transmissions. All transmissions, other than the one directed to the particular receiver, are perceived as interference.

This interference is currently countered through the use of available spectral bandwidth and Code Division Multiple Access ("CDMA"). However, bandwidth is limited, and, as wireless communications increase, interference will increase substantially, to the point that the current techniques to avoid or eliminate interference will not work.

Space-Time Adaptive Processing ("STAP") techniques suppress the dynamic interference encountered by airborne surveillance radars. These STAP techniques have reduced interference in wireless communications (T. S. Rappaport, *Wireless Communications: Principles and Practice*. Englewood Cliffs, N.J., 1996; J. C. Liberti and T. S. Rappaport, *Smart Antennas for Wireless Communications: IS-95 and Third Generation CDMA Applications*. Upper Saddle River, N.J., 1997).

STAP techniques adaptively combine data from several pulses and antenna elements to suppress interference. Each STAP technique uses a distinct algorithm to calculate the adaptive weights applied to the returns from each element and pulse. These weights are calculated to give maximum response from an antenna, a "main beam", at a chosen look angle and normalized look-Doppler frequency while simultaneously suppressing interference. The weights are applied through multipliers to obtain weighted returns. The weighted returns are then added together to form a single output. If the output exceeds a threshold value, a target is deemed to be present.

In the prior art, adaptive weights are calculated by two broad classes of algorithms: statistical and direct data domain. Each has advantages and drawbacks.

Statistical STAP techniques succeed because the Coherent Processing Interval ("CPI"), or adaptive dwell time, is short enough that the interference environment does not change. The adaptive dwell time determines how long data is collected before a new set of adaptive weights is calculated. Within this adaptive dwell time, the STAP technique estimates the interference and calculates the weights that suppress it. If the interference changes within the adaptive period, the interference estimate will be corrupt and the resulting filter mismatched to the interference.

Statistical algorithms fail when the secondary data does not reflect the statistics of the interference in the range cell of interest, i.e., when the data is non-homogeneous. This situation occurs when the CPI length is too long, allowing the interference to change within the adaptive dwell time. However, both an airborne radar and a communications system commonly encounter non-homogeneous data no matter what the CPI length. In many real-world situations, e.g., airborne surveillance over land-sea interfaces, dense target environments, the data is non-homogeneous.

Purely statistical STAP techniques for airborne radar estimate the interference within the range cell of interest from the surrounding range cells. In a communications system, the covariance matrix of the interference is estimated from the entire data block. An adaptive filter that suppresses the interference is generated from this estimate by second-order statistics. This technique works only if the interference statistics in the surrounding range cells accurately reflect the interference statistics in the range cell of interest. That is, the data must be independent, identically distributed ("i.i.d."), or homogeneous, data.

The reverse of homogeneity, non-homogeneity, occurs commonly in real-world radar transmissions. Non-homogeneous data is defined as that from any range cell or cells whose interference statistics are not identical to the other range cells within the data set. The obvious example is a discrete interferer or target. Other examples include terrain transitions, such as going from sea to land or from flat desert to mountains. Any interference that is not i.i.d. is non-homogeneous.

One example of non-homogeneous data is a strong return signal through a sidelobe that does not correspond in either angle or Doppler to the look direction of the radar. In this example, the return is known as a discrete interferer. When the radar is looking in a direction, indicated by the mainbeam, other than that of the discrete interferer, the interferer can mask a small target or give a false indication of a target where one does not exist. In a communications system, this situation is characterized, not by "false alarms", but by bleed-over from another conversation or data transmission. High sidelobes commonly cause problems of discrete interference for STAP techniques.

Methods currently exist to detect non-homogeneities within a data set (M. C. Wicks, W. L. Melvin, and P. Chen, "An efficient architecture for nonhomogeneity detection in space-time adaptive processing for airborne early warning radar," *Proceedings of the 1997 IEE Radar Conference*, October 1997, Edinburgh, UK; W. L. Melvin and M. C. Wicks, "Improving practical space-time adaptive radar," *Proceedings of the 1997 IEEE National Radar conference*, May 1997. Syracuse, N.Y.; R. S. Adve, T. B. Hale, and M. C. Wicks, "Transform domain localized processing using measured steering vectors and non-homogeneity detection," *Proceedings of the 1999 IEEE National Radar Conference*, April 1999, Boston, Mass.). However, none of the methods for detecting non-homogeneities address what to do with cells that contain non-homogeneous data. Non-homogeneity means that the statistics within a particular data cell are not reflected in surrounding data cells. Thus statistical algorithms fail with such data.

The inability of statistical STAP algorithms to deal with non-homogeneities in the range cell of interest led us to consider non-statistical or direct data domain algorithms. These algorithms take data from only the range cell of interest, thereby suppressing discrete interferers within that range cell and eliminating the sample support problems associated with statistical approaches.

Research on direct data domain algorithms has focused on one-dimensional spatial adaptivity (T. K. Sarkar and N. Sangruji, "An adaptive nulling system for a narrow-band signal with a look-direction constraint utilizing the conjugate gradient method," *IEEE Transactions on Antennas and Propagation* 37: 940–944 (July 1989); S. Park and T. K. Sarkar, "A deterministic eigenvalue approach to space time adaptive processing," *Proceedings of the IEEE Antennas and Propagation Society International Symposium*, 1168–1171 (July 1996)). All direct data domain algorithms currently in STAP techniques are one-dimensional. Thus they are incapable of remedying the defects of statistical STAP techniques.

Thus there is need for a STAP technique that overcomes the drawbacks of the prior art by combining statistical and non-statistical (i.e., direct data domain) algorithms into a hybrid.

OBJECTS AND SUMMARY OF THE INVENTION

Therefore, one object of the present invention is to provide a STAP technique that overcomes the drawbacks of the prior art.

Another object of the present invention is to provide a STAP technique that combines the advantages of the statistical and direct data domain algorithms while overcoming their deficiencies.

Still another object of the present invention is to provide a STAP algorithm capable of suppressing discrete interferers within a range cell of interest.

The present invention embodies a new adaptive algorithm specifically for detecting a target within a non-homogeneous data cell, i.e., for the radar example, a range cell. The present invention is the first technique that solves the problem of non-homgeneous data, an issue critical to the application of STAP algorithms to radar and communications systems.

Discrete interferers are the most commonly encountered non-homogeneities for an airborne surveillance platform. A discrete interferer was previously defined as another target present in the range cell of interest but at an angle and/or look-Doppler different from the desired look-direction. The present invention suppresses discrete interferers by two-stage adaptive processing, a technique never previously applied.

Similarly, discrete interferers are of primary concern for digital communications systems. In a communications system two subscribers may talk simultaneously. Any signal transmission other than the one desired acts as a discrete interferer. The prior art suppresses these interferers through frequency allocation, thereby using up precious bandwidth, or by CDMA technology. As digital wireless becomes more prevalent, the available resources will be used up, forcing alternative methods. The present invention can be applied to ensure the future growth of digital wireless communication systems.

The present invention is the first solution to the problem of detecting targets within non-homogeneous range cells. The present invention employs a new adaptive algorithm to detect a target within a non-homogeneous data cell. Without the apparatus and method of the present invention, STAP techniques cannot fulfill their promise in radar and communications systems.

The Two-Stage Hybrid algorithm of the present invention offers significant improvement in the false alarm rate and detection performance of STAP techniques in non-homogeneous environments. One likely application of the present invention is the Airborne Warning and Control System ("AWACS") or the Joint Surveillance Target Attack Radar System ("JSTARS"). The ability of these systems to direct attack aircraft is greatly hindered if the radar is unable to detect small targets because of off-azimuth/off-Doppler interferers. The present invention eliminates this problem. The present invention is also the first STAP technique capable of suppressing coherent repeater jammer techniques such as range and Doppler false targets.

Briefly stated, the present invention offers a Two-Stage Hybrid algorithm that gives significant improvement in the false alarm rate and detection performance of Space-Time Adaptive Processing in non-homogeneous environments for both radar and digital communications. The first stage analyzes data from a range cell of interest by direct data domain processing, suppressing discrete interferers within the range cell of interest. The second stage implements a purely statistical STAP algorithm, preferably an enhanced version of the Joint-Domain Localized ("JDL") statistical algorithm. For radar this second stage estimates the interference within the range cell of interest from the surrounding range cells. For a communications system, the second stage estimates the covariance matrix of the interference from the entire data block. For both radar and communications, an adaptive filter that suppresses the interference is generated from the estimate by second-order statistics. The present invention is the first two-dimensional STAP technique; all prior-art is one-dimensional.

According to an embodiment of the invention, [FIRST INDEPENDENT CLAIM]

According to a feature of the invention, [SECOND INDEPENDENT CLAIM]

These and many other objects and advantages of the present invention will be readily apparent to one skilled in the pertinent art from the following detailed description of a preferred embodiment of the invention and the related drawings, in which like reference numerals designate the same elements.

DESCRIPTION OF THE PREFERRED EMBODIMENT

Figure 1:
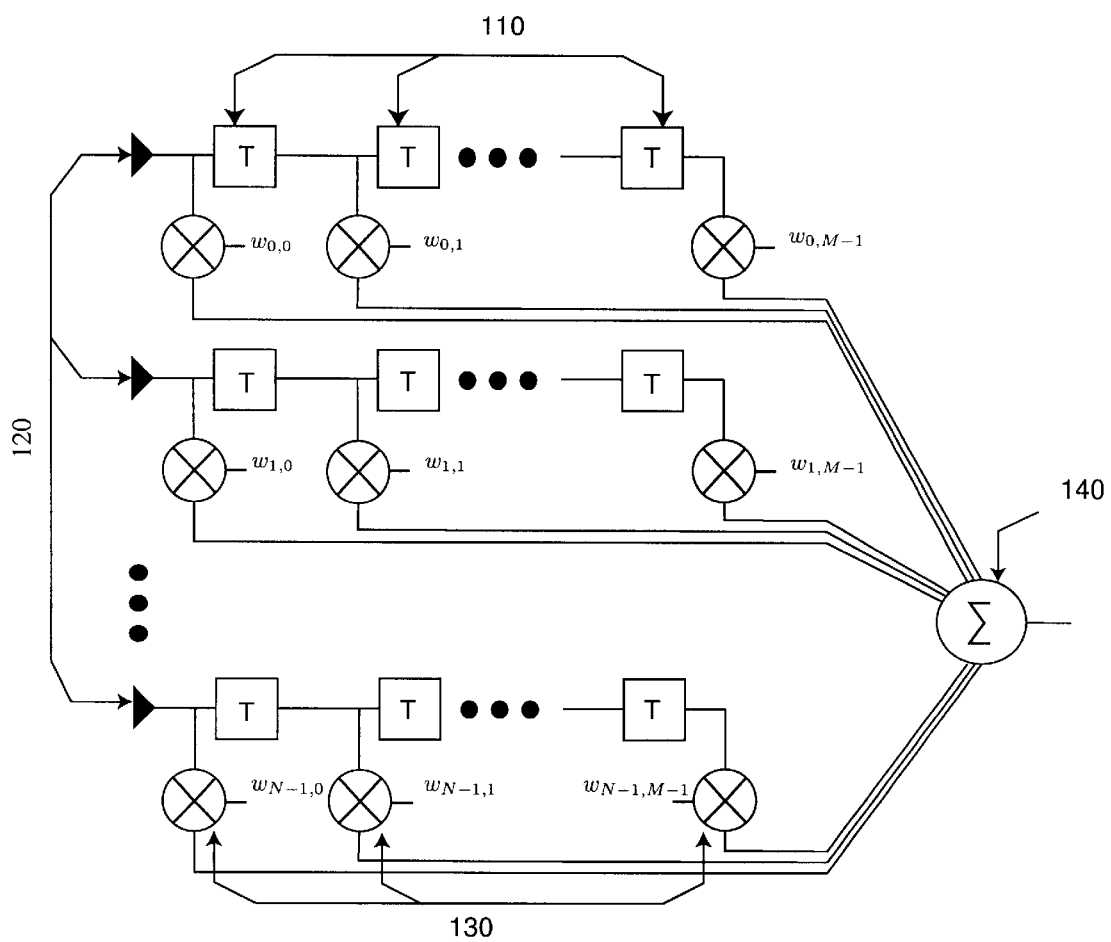
FIG. 1 is a schematic diagram of radar transmission and reception.

Referring to FIG. 1, STAP algorithms adaptively combine data from several pulses 110 and antenna elements 120 to achieve maximum suppression of interference. Each STAP algorithm offers its own way to calculate the adaptive weights applied to the returns from each member of antenna elements 120 and pulses filtered through time delays 110. These weights, indicated by $w_{ij}$, $\forall$ i=0, ..., N-1 and j=0, ..., M-1, are calculated to give a maximum antenna response, the main beam, at a chosen look angle $\phi_t$, and normalized look-Doppler frequency $\overline{\omega}_t$ at the same time as they suppress interference. Weights $w_{ij}$ are applied through multipliers 130. The weighted returns are then added together in an adder/combiner 140 to form a single output. A target is deemed present if the output from adder/combiner 140 exceeds a certain threshold.

The framework of FIG. 1 describes all STAP algorithms. Algorithms differ in the method by which they calculate the adaptive weights, $w_{ij}$. In the prior art, two broad classes exist to calculate adaptive weights: statistical and direct data domain algorithms. The present invention creates a third class by hybridizing these two classes of the prior art.

Figure 2:
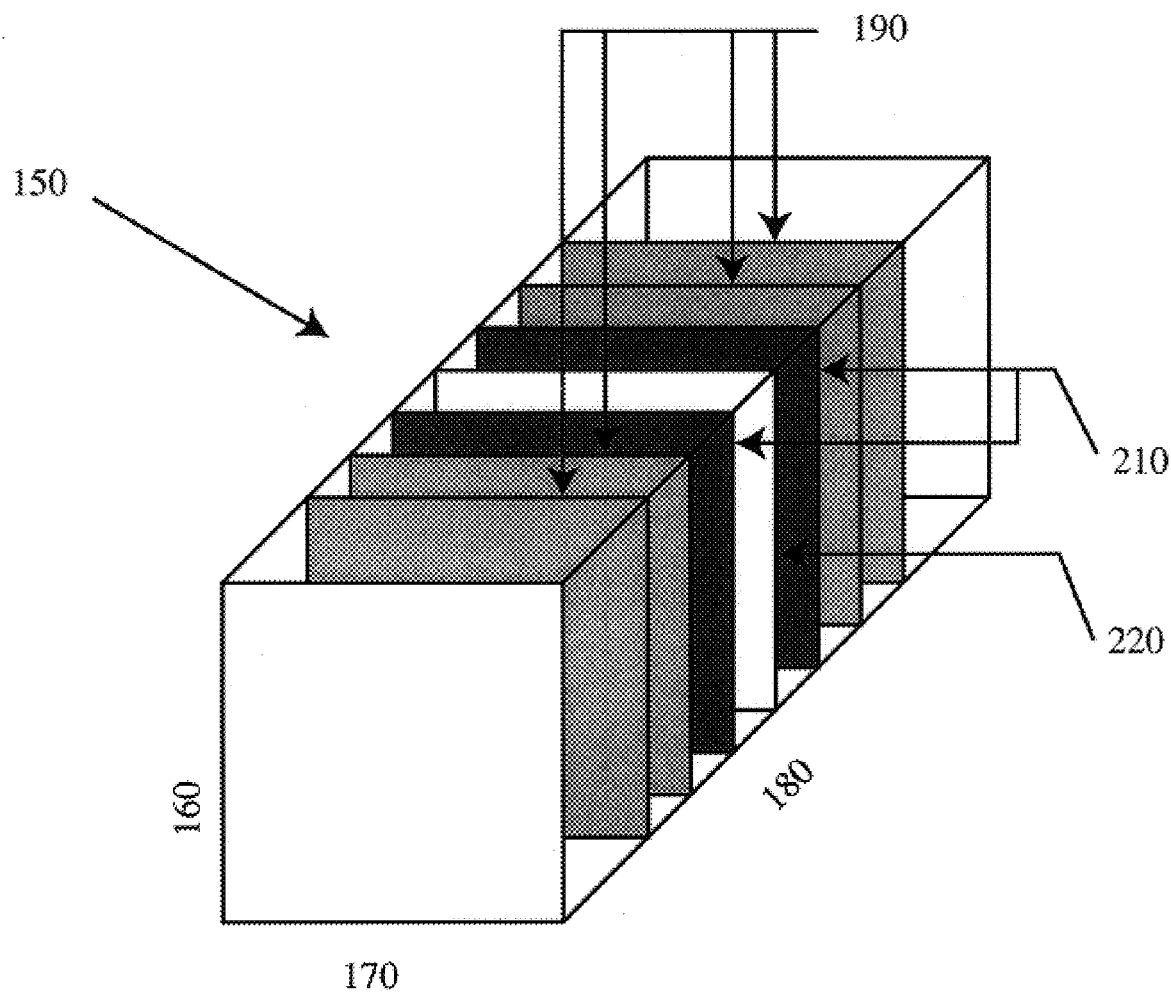
FIG. 2 is a perspective view of a data cube of radar signals.

Referring to FIG. 2, each of range cells 180 contains data 160 from all N antenna elements, thereby yielding a first dimension of a data cube 150. Adaptivity can be applied over the entire N antenna elements or just a subset, depending on the application and computational limitations. A second dimension of data cube 150 is data 170 from M pulses within the CPI or adaptive dwell time. The number of pulses must be chosen large enough to supply sufficient Degrees of Freedom ("DOF") to effectively suppress interference. However, choosing M too large increases the adaptive dwell time, or CPI length, so that the interference changes within the CPI. A second drawback of choosing M too large is an increased computational load. DOF refers to the number of adaptive weights used. For example, the architecture of FIG. 1 is filly adaptive, and there are NM weights. Therefore, there are NM DOF.

The number of range cells 180 constitutes the third and final dimension of data cube 150. This number is primarily a function of specific radar parameters: pulse width, Pulse Repetition Interval ("PRI"), and sampling period.

From the data within data cube 150, interference within a test primary range cell 220 is estimated by averaging a large set of surrounding range cells, or secondary data cells 190. Guard cells 210 on either side of primary range cell 220 avoid corrupting the estimate of interference with target bleed-over that results from pulse compression. The estimate of interference is in the form of second-order statistics, i.e., the correlation matrix. By assuming secondary data to have a zero mean, the correlation matrix becomes synonymous with the covariance matrix. From the estimated covariance matrix R, classical statistical STAP algorithms calculate an adaptive filter that suppresses the interference within the test range cell. (A ^ over any variable indicates an estimate of that variable.) The true interference covariance matrix is unknown. This process is repeated for each range cell of interest.

Statistical algorithms fail when data from secondary data cells 190 do not reflect the statistics of the interference in primary range cell 220, i.e., when the data is non-homogeneous.

Figure 3:
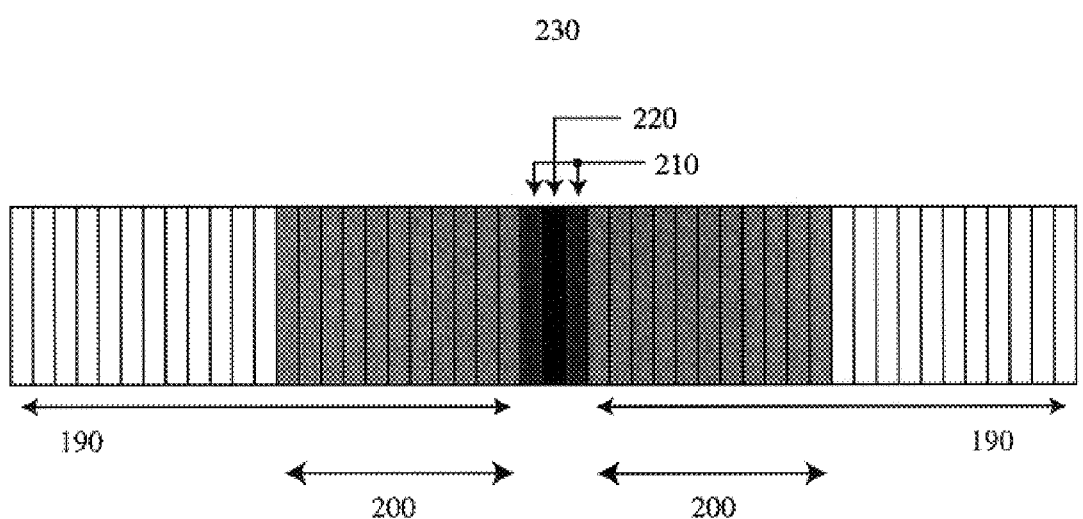
FIG. 3 shows the range cells from the data cube of FIG. 2.

Referring to FIG. 3, selecting surrounding range cells to estimate interference is simple if the data is i.i.d. Since the data is homogeneous, a symmetric window 230 of data large enough to support the DOF in the algorithm suffices. Symmetric window 230 is generally chosen between two and four times the DOF secondary data samples to estimate the interference covariance matrix. Primary range cell 220 represents the cell under test or the range cell examined for the presence of a target. The interference within primary range cell 220 is suppressed by estimating the interference from a set of secondary range cells 200.

Figure 4:
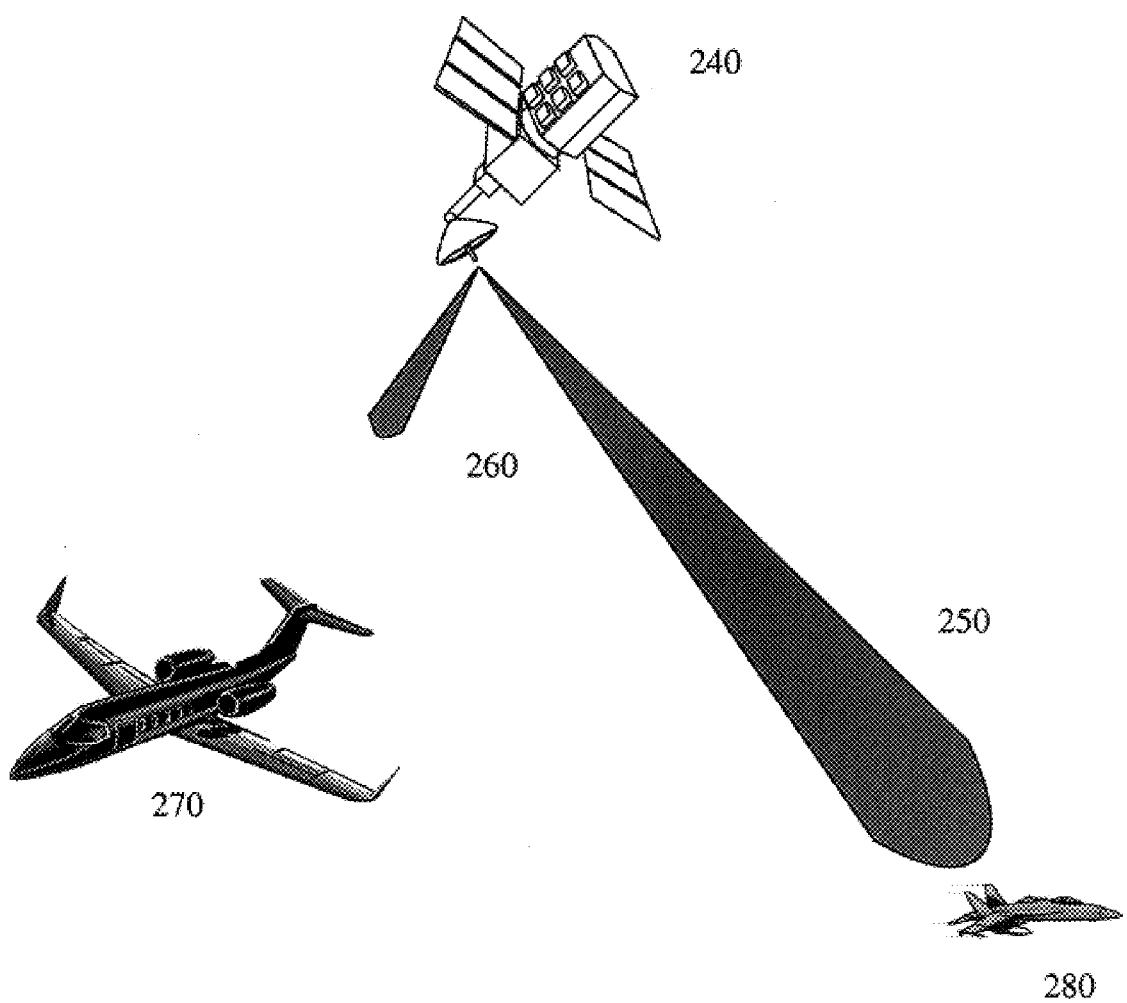
FIG. 4 shows the relationships among an airborne radar, its signals, and primary and secondary targets detected by the signals.

Non-homogeneity occurs commonly in real-world radar situations. Referring to FIG. 4, a strong return signal comes from an aircraft 270 through a sidelobe 260 that does not correspond, in either angle or Doppler, to a look direction of a mainbeam 250 of a radar 240. In this example, the return from aircraft 270 is a discrete interferer. When radar 240 looks in a direction other than that of the discrete interferer, as indicated by mainbeam 250, the interferer from aircraft 270 can mask a small target 280 or give a false indication of target presence if target 280 does not exist.

Figure 5:
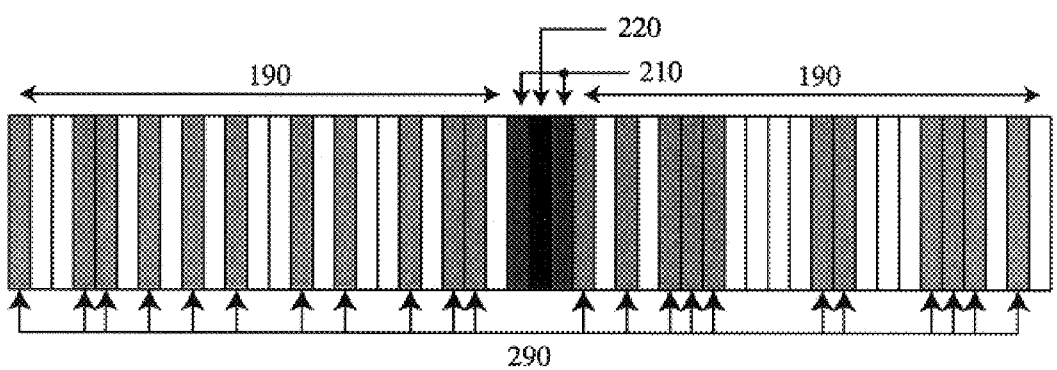
FIG. 5 shows a set of range cells, from the data cube of FIG. 2, containing non-homogeneous data.

Referring to FIG. 5, non-homogeneities in the data cause loss of performance because they perturb the estimate $\hat{R}$ of the covariance matrix. To minimize the loss, a Non-Homogeneity Detector ("NHD") can identify secondary data cells that do not reflect the statistical properties of the primary data. These data samples are then eliminated from the estimate $\hat{R}$ of the correlation matrix. To avoid corrupting $\hat{R}$, data from primary range cell 220 and guard cells 210 are not used to estimate interference. In this case, the NHD yields a selection 290 from available secondary range cells 190 that is quite different from the set of secondary range cells 200 of FIG. 3. Selection 290 contains the most homogeneous range cells, and excising those that do not reflect the statistics of the cell under test greatly improves detecting a target in primary range cell 220. However, NHDs do not specify how to detect targets within those range cells identified as non-homogenous. The surrounding range cells do not possess information about the non-homogeneity. Hence a statistical algorithm cannot suppress a discrete interferer in primary range cell 220. This problem is not addressed by the prior art.

The present invention employs a Two Stage Hybrid STAP algorithm. Rather than describe fully the present invention for the two cases of interest, an airborne surveillance radar and a digital wireless communications system, in the interests of brevity we present only the radar framework. The application of the present invention to digital wireless communication is essentially identical.

The algorithm employed in the present invention implements two separate stages of adaptive filtering. The first stage uses data only from the range cell of interest, employing a technique known as direct data domain processing. This first stage suppresses discrete interferers within the range cell of interest. The direct data domain technique of the present invention is the first two-dimensional technique, as all prior-art techniques are one-dimensional.

The second stage of processing implements an enhanced version of the Joint-Domain Localized ("JDL") statistical algorithm (H. Wang and L. Cai, "On adaptive spatial-temporal processing for airborne surveillance radar systems," *IEEE Transactions on Aerospace and Electronic Systems* 30: 660–699 (July 1994)) that suppresses interference correlated in angle and Doppler. The overall performance of this Two-Stage Hybrid algorithm is superior within non-homogeneous range cells to any other STAP technique.

The present invention is based on the constant phase and time progression of a target signal from element to element and pulse to pulse, respectively. For example, when the angle of an arriving signal is known or assumed, the phase difference from element to element for a target return for that angle can be calculated. Using this known phase difference, the target signal can be eliminated from the data, leaving only interference terms. The interference terms are left because they arrive at angles different from the target signal's arrival. These terms yield an estimate of the interference for which an adaptive filter can be generated and applied.

The key is knowing the angle of arrival. For a surveillance radar that tests for target presence at each angle, we simply assume a target exists in the look direction until proven otherwise by the output of the adaptive processing algorithm. Temporal adaptivity is accomplished in the same manner.

We first describe the spatially adaptive portion of the direct data domain algorithm. We then describe the temporal adaptivity. Finally, we put the two together to form the two-dimensional direct data domain algorithm of the present invention.

Figure 6:
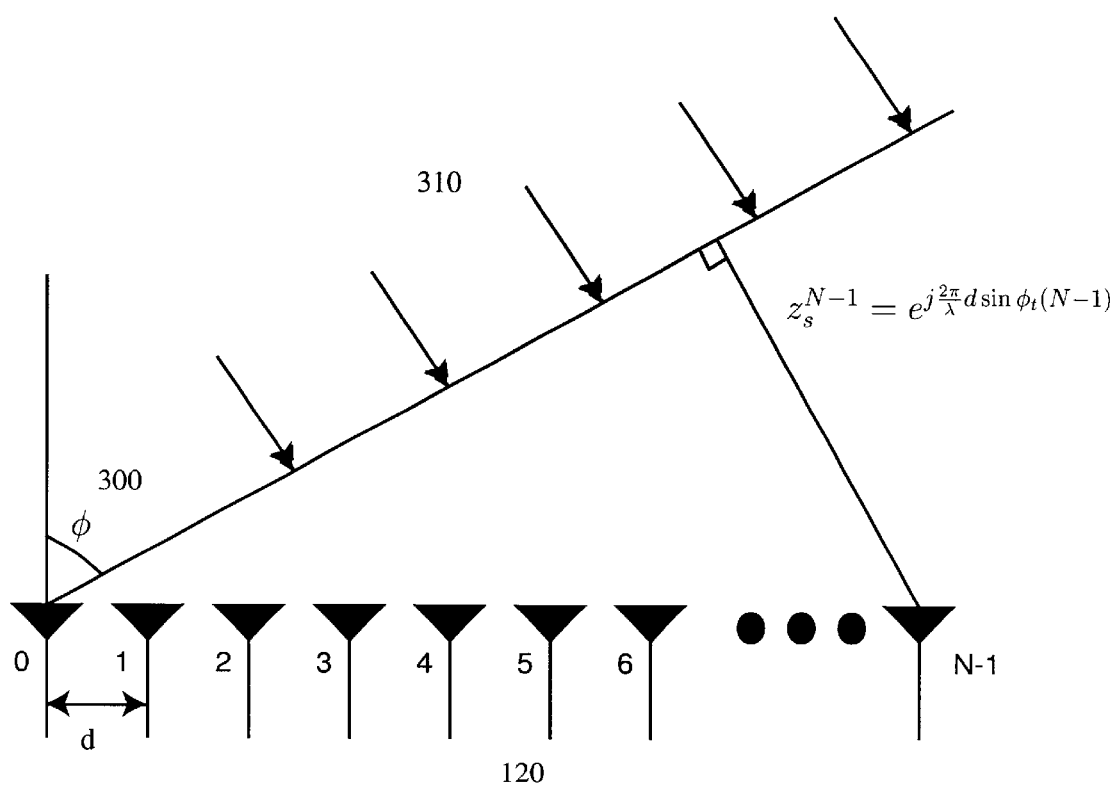
FIG. 6 shows the spatial characteristics of an arriving radar signal in relation to antenna elements.

Referring to FIG. 6, consider a linear array of equispaced, isotropic point sensors. Each of N antenna elements 120 receives returns corresponding to the M pulses transmitted per CPI. This space-time data is used to decide between the presence and absence of a target at an azimuth look direction 300, where $\phi=\phi_t$, and a normalized Doppler frequency $\omega=\omega_t$. A plane wave 310 represents a reflection of the transmitted radar pulse from either a target or interference. FIG. 6 shows only the spatial characteristics of the antenna array; it does not show the temporal characteristics associated with the transmitted pulses or Doppler frequency.

The data received from antenna elements 120 and transmitted pulses can be written as a N×M matrix X, where $X_{nm}$ represents the returns at the $n^{th}$ element from the $m^{th}$ pulse. This matrix is a cut of data cube 150 (see FIG. 2). Data matrix X is a sum of signal, interference, and thermal noise components. The mathematical form of data matrix X is given by $$X = \begin{bmatrix} X_{0,0} & X_{0,1} & \cdots & X_{0,M-1} \\ X_{1,0} & X_{1,1} & \cdots & X_{1,M-1} \\ X_{2,0} & X_{2,1} & \cdots & X_{2,M-1} \\ X_{3,0} & X_{3,1} & \cdots & X_{3,M-1} \\ \vdots & \vdots & \ddots & \vdots \\ X_{N-1,0} & X_{N-1,1} & \cdots & X_{N-1,M-1} \end{bmatrix}. \quad (1)$$

Figure 7:
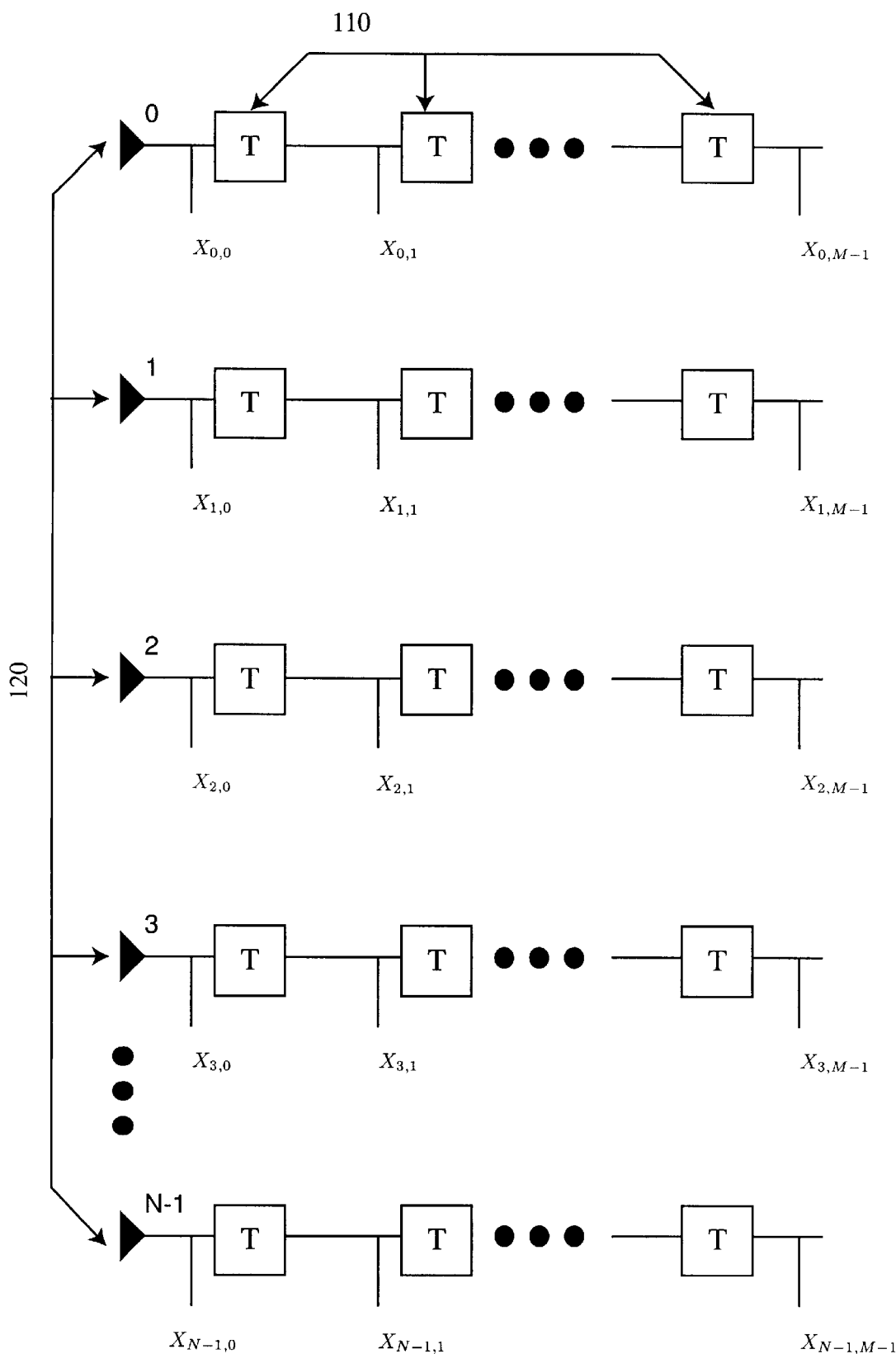
FIG. 7 shows the temporal characteristics of an arriving radar signal in relation to antenna elements.

Referring to FIG. 7, the returns from N antenna elements 120 and M time delays 110 correspond to the M pulses transmitted by the radar during the CPI. The data received from each element and pulse (e.g., the data from element 0, pulse 0) forms the matrix of Equation (1). Data matrix X is a sum of signal, interference, and thermal noise expressed as X=S+I+N.

Using the desired look direction and velocity, a signal matrix S can be written, in the same form as X, as $$S = \xi_t a(x) b^T, \quad (2)$$

$$a = [1 \; z_s z_s^2 \; \ldots \; z_s^{(N-1)}]^T \quad (3)$$

$$b = [1 \; z_t z_t^2 \; \ldots \; z_t^{(M-1)}]^T \quad (4)$$

$$z_s = e^{j2\pi/\lambda \sin \phi_t}, \quad (5)$$

$$z_t = e^{j2\pi\bar{\omega}_t}, \quad (6)$$

where $z_t$ is the signal amplitude, $(x)$ is the Kronecker product, d is the distance between two adjacent elements, and $\lambda$ is the wavelength of the radar. The vectors a and b form respectively the spatial and temporal steering vectors. Note that target returns from an azimuth angle and/or velocity other than the look-azimuth/velocity are, effectively, discrete interferers. Detection of a target should be declared only if it matches the look direction and velocity.

Equation (3) shows that the signal, or reflected plane wave, progresses by a constant phase $z_s$ from one element to the next. This constant-phase progression from element to element is a function of the angle at which the reflected plane wave strikes the array. If this angle is zero, $z_s=1$, and there is no phase progression from element to element, as one would expect for a wave impinging directly on the array. Multiplying the signal received from each element by the appropriate phase delay, $z_s^{-n}$ (where n is the element number) aligns the phase of the target signal. An example, using the returns from any two adjacent elements, shows that the signal component cancels out of the expression, leaving only interference terms. That is:

$$X_{n,m} = S_{n,m} + I_{n,m} + N_{n,m} \quad (7)$$

$$X_{n,m} = \xi_t z_s^n z_t^m + I_{n,m} + N_{n,m} \quad (8)$$

$$X_{n+1,m} = \xi_t z_s^{n+1} z_t^m + I_{n+1,m} + N_{n+1,m} \quad (9)$$

$$X_{n,m} - z_s^{-1} X_{n+1,m} = \xi_t z_s^n z_t^m + I_{n,m} + N_{n,m} - \quad (10)$$
$$z_s^{-1}(\xi_t z_s^{n+1} z_t^m + I_{n+1,m} + N_{n+1,m})$$

$$= \underbrace{I_{n,m} - z_s^{-1} I_{n+1,m}}_{\text{Interference Only}} + \underbrace{N_{n,m} - z_s^{-1} N_{n+1,m}}_{\text{White Noise Sample}} \quad (11)$$

where $I_{n,m}$ represents the interference present in the return signal on the $n^{th}$ element and $m^{th}$ pulse caused by clutter, jamming, multi-path reflection, etc. Similarly, the thermal, or white, noise on the $n^{th}$ element and $m^{th}$ pulse is $N_{n,m}$. From this property, a matrix of interference (and white noise) components can be constructed to obtain a non-statistical, or direct data domain, algorithm.

The entries in the matrix are formed by taking the difference between adjacent elements, thereby estimating the interference, not from statistics, but from data within the range cell of interest. The entries in this N×M matrix C, defined to be $$\begin{bmatrix} X_{0,0} - z_s^{-1} X_{1,0} & X_{1,0} - z_s^{-1} X_{2,0} & \cdots & X_{N-2,0} - z_s^{-1} X_{N-1,1} \\ X_{0,1} - z_s^{-1} X_{1,1} & X_{1,1} - z_s^{-1} X_{2,1} & \cdots & X_{N-2,2} - z_s^{-1} X_{N-1,2} \\ \vdots & \vdots & \vdots & \vdots \\ X_{0,M-1} - z_s^{-1} X_{1,M-1} & X_{0,M-1} - z_s^{-1} X_{2,M-1} & \cdots & X_{N-2,M-1} - z_s^{-1} X_{N-1,M-1} \end{bmatrix}, \quad (12)$$

are interference terms only. This matrix of interference estimates from adjacent elements (the spatial domain) is the spatial interference matrix.

Figure 8:
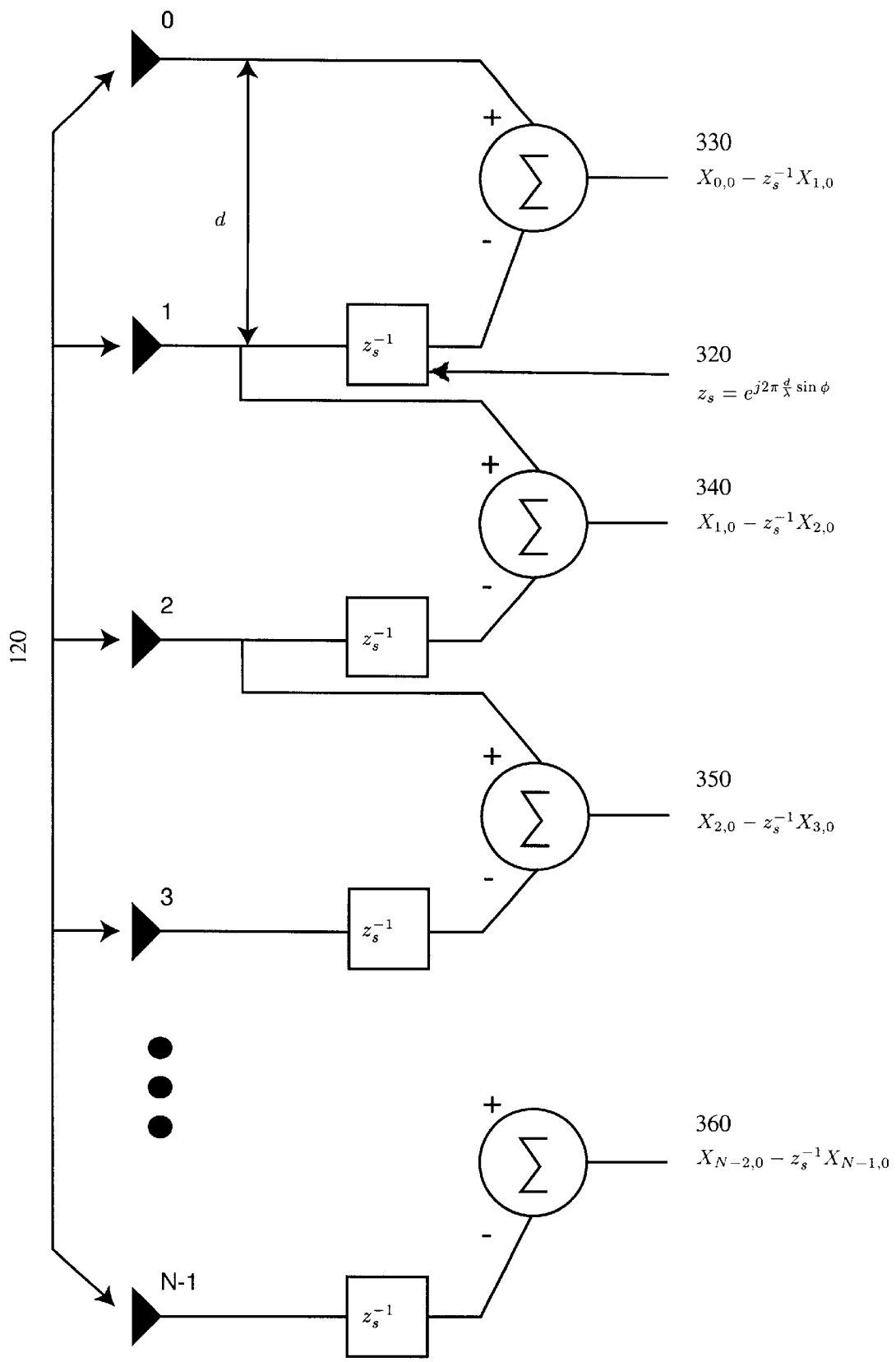
FIG. 8 shows a physical interpretation of the spatial interference matrix.

FIG. 8 interprets physically the spatial interference matrix C. A constant spatial delay 320 is necessary to ensure the target signal cancels out in the subtraction operation between antenna elements 120 independent of target amplitude and phase. Spatial interference terms 330, 340, 350, and 360 are the result of the subtraction operation. Though FIG. 8 shows only the first transmitted pulse of the radar, the matrix is composed of interference terms from every pulse within the CPI or data cube 150.

Now consider the two scalar functions of the spatial adaptive weight vector:

$$G_{w_a} = w_s^H a_{N-1} a_{N-1}^H w_s = |w_s^H a_{N-1}|^2 \quad (13)$$

and $$I_{w_a} = w_s^H C^T C^* w_s = \|w_s^H C^T\|_2^2 \quad (14)$$

where $a_{N-1}$ is the vector comprising the first N−1 entries of steering vector a defined in Equation (3). The term $G_{ws}$ in Equation (13) represents the signal power in the look direction from the adaptive filter $w_s$. The term $I_{ws}$ in Equation (14) represents the residual interference power after application of the adaptive filter. The new direct data domain algorithm solves for $w_s$ by maximizing the difference between the two terms, i.e., $$\max_{\|w_s\|_2=1} [G_{w_s} - I_{w_s}] = \max_{\|w_s\|_2=1} w_s^H [a_{N-1} a_{N-1}^H - \kappa^2 C^T C^*] w_s. \quad (15)$$

The constraint $\|w_s\|_2=1$ guarantees a finite solution.

The above formulation puts as much gain as possible on the target while at the same time suppressing interference. The scaling term $\kappa^2$ is required to keep the level of the terms within the matrix outer product $C^T C^*$ in line with that of the terms within the vector outer product $a_{N-1} a_{N-1}^H$. An expression for the optimum value of $\kappa^2$ has proven extremely difficult to determine. We suggest $$\kappa^2 = \frac{\sqrt{NM}}{\|vec(X)\|_2}, \quad (16)$$

where vec(X) stacks the columns of the matrix X, thereby creating a column vector.

Using the method of Lagrange multipliers (C. W. Terrien, *Discrete Random Signals and Statistical Signal Processing* (Englewood Cliffs, N.J., 1992)), the weight vector that maximizes the term in Eqn (15) is the eigenvector that corresponds to the largest eigenvalue of the matrix $[a_{N-1} a_{N-1}^H - \kappa^2 C^T C^*]$. This weight vector forms the spatial adaptive filter.

The matrix C is of dimension M×(N−1). We lose one DOF because the subtraction involves adjacent elements, and the final element has an adjacent element on only one side. Therefore the weight vector is of length (N−1), representing a loss of one DOF in the spatial domain. This loss of only one DOF compares favorably with other non-statistical algorithms, where nearly half the degrees of freedom are lost.

In the temporal domain, the signal progresses pulse-to-pulse by the same phase; therefore the signal component cancels out similarly to the spatial adaptivity:

$$X_{n,m} = S_{n,m} + I_{n,m} + N_{n,m} \quad (17)$$

$$X_{n,m} = \xi_t z_s^n z_t^m + I_{n,m} + N_{n,m} \quad (18)$$

$$X_{n,m+1} = \xi_t z_s^n z_t^{m+1} + I_{n,m+1} + N_{n,m+1} \quad (19)$$

$$X_{n,m} - z_t^{-1} X_{n,m+1} = \xi_t z_s^n z_t^m + I_{n,m} + N_{n,m} - \quad (20)$$
$$z_t^{-1}(\xi_t z_s^n z_t^{m+1} + I_{n,m+1} + N_{n,m+1})$$

$$= \underbrace{I_{n,m} - z_t^{-1} I_{n,m+1}}_{\text{Interference Only}} + \underbrace{N_{n,m} - z_t^{-1} N_{n,m+1}}_{\text{White Noise Sample}} \quad (21)$$

We can therefore obtain a length (M−1) temporal weight vector $w_t$ by a formulation similar to Equations (12)–(15). The derivation begins as before with the introduction of the two power terms, $$G_{w_t} = w_t^H b_{M-1} b_{M-1}^H w_t = |w_t^H b_{M-1}|^2 \quad (22)$$

and $$I_{w_t} = w_t^H D^T D^* w_t = \|w_t^H D^T\|_2^2 \quad (23)$$

where $b_{M-1}$ is a vector that comprises the first (M−1) entries of the steering vector b, and D is a temporal interference matrix similar to C. The term $G_{wt}$ represents the desired signal power in the Doppler-look direction that results from the adaptive filter $w_t$. The term $I_{wt}$ represents the residual interference power after application of the adaptive filter. Again, the new direct data domain algorithm solves for the weight vector by maximizing the difference between the two terms, i.e., $$\max_{\|w_t\|_2=1} [G_{wt} - I_{wt}] = \max_{\|w_t\|_2=1} w_t^H [b_{M-1} b_{M-1}^H - \kappa^2 D^T D^*] w_t. \quad (24)$$

The constraint $\|w_t\|_2=1$ guarantees a finite solution.

The weight vector that maximizes the difference is again the eigenvector that corresponds to the largest eigenvalue, but now of the matrix $[b_{N-1} b_{N-1}^H - \kappa^2 D^T D^*]$. This weight vector forms the temporal adaptive filter. The length of the weight vector represents a loss of one DOF in the temporal domain.

The length N×M two-dimensional adaptive weight vector is created by $$w(\phi_t, \bar{\omega}_t) = \begin{bmatrix} w_t(\bar{\omega}_t) \\ 0 \end{bmatrix} \otimes \begin{bmatrix} w_s(\phi_t) \\ 0 \end{bmatrix}. \tag{25}$$

The zeros appended to the spatial and temporal weight vectors represent the lost DOF in space and time. Using this adaptive weight vector, the output of the algorithm corresponds to angle $\phi_t$ and normalized Doppler $\bar{\omega}_t$ and is given by $$\chi(\phi_t, \bar{\omega}_t) = w^H \text{vec}(X), \tag{26}$$

where vec(X) stacks the columns of X into a length NM×1 vector.

The above formulation sidesteps the high sidelobe problems known to be associated with prior-art direct data domain algorithms (R. Schneible, "A Least Squares approach to radar array adaptive nulling," Ph.D. thesis, Syracuse University, 1996). The resulting signal estimates are thus free from the effects of non-homogeneities.

However, given i.i.d. training data, direct data domain algorithms generally fail to suppress correlated interference as much as statistical STAP algorithms do. This failure results because one obtains the interference estimate from only the data within the range cell of interest rather than from statistical estimation. The major advantage of the algortithm of the present invention, to suppress non-homogeneities, inhibits performance in the homogeneous portion of the interference environment. So incorporating statistical signal processing techniques can counteract this weakness. This leads to the second stage of adaptivity found in the Two-Stage Hybrid algorithm of the present invention.

Modifying a version of the JDL algorithm improves performance and flexibility. Modified JDL is a statistical approach to adaptive filtering that generates an interference estimate from second-order statistics. These second-order statistics are characterized by the interference correlation matrix R, synonymous with the covariance matrix since the random processes in the radar problem are assumed to have a zero mean.

Where the direct data domain algorithm presented above is fully adaptive, modified JDL is easily scaled down to be partially adaptive. Partial adaptivity is mandatory for real-world application. The primary reason for this requirement is not real-time computational limitations but limited sample support from which to estimate statistical interference.

The modified JDL algorithm first converts the space-time data contained in X, of dimension N×M or elements by pulses, to the angle-Doppler domain. For an ideal antenna, we apply the two-dimensional Discrete Fourier Transform ("DFT"). For an ideal antenna array, the columns of the DFT matrix correspond to space-time steering vectors. A space-time steering vector is the Kronecker product of the individual spatial and temporal steering vectors, i.e., $$v(\bar{\omega}, \phi) = b(\bar{\omega}) \otimes a(\phi). \tag{27}$$

Figure 9:
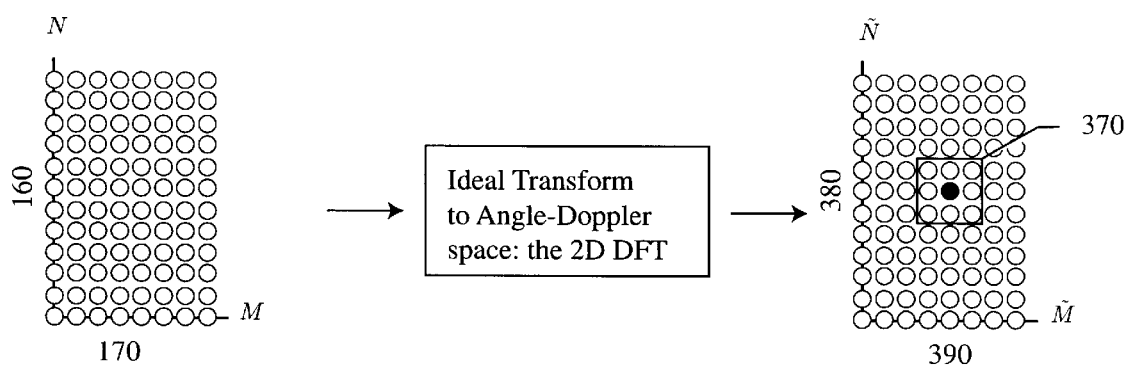
FIG. 9 is a schematic showing how the Joint-Domain Localized ("JDL") algorithm applies adaptivity only within a small region of the angle-Doppler space, a Localized Processing Region.

Referring to FIG. 9, the JDL algorithm applies adaptivity only within a small region of the angle-Doppler space, a Localized Processing Region 370 ("LPR"). We apply an adaptive filter only within LPR 370 of the angle-Doppler domain, which comprises angle data 380 and Doppler data 390. We then show the transformation in a form that results only in LPR 370 instead of the entire angle-Doppler domain.

To apply two-dimensional linear algebra, we reformat the data matrix into a column vector, $$\chi = \text{vec}(X). \tag{28}$$

The transformation for only the data within LPR 370 can then be written as $$\tilde{\chi} = T^H \chi, \tag{29}$$

where the represents data that has been transformed to the angle-Doppler space. The transformation matrix T for the ideal antenna array is comprised of the space-time steering vectors that corresponding to the angle and Doppler bins within LPR 370, $$T = \begin{bmatrix} v(\bar{\omega}_{-1}, \phi_{-1}) & v(\bar{\omega}_{-1}, \phi_0) & v(\bar{\omega}_{-1}, \phi_1) \\ v(\bar{\omega}_0, \phi_{-1}) & v(\bar{\omega}_0, \phi_0) & v(\bar{\omega}_0, \phi_{-1}) \\ v(\bar{\omega}_1, \phi_{-1}) & v(\bar{\omega}_1, \phi_0) & v(\bar{\omega}_1, \phi_1) \end{bmatrix}. \tag{30}$$

This example of a transformation matrix is for a 3×3 LPR 370 centered about the (0,0) angle-Doppler bin.

When we apply the JDL algorithm to a real antenna system, various factors, from element mismatch to mutual coupling between elements, combine to make inapplicable the mathematics that apply to the ideal antenna We must use measured spatial steering vectors to eliminate the effects of these factors. For a real antenna system, we can't use the DFT to transform spatial data to the angle domain. So we transform to the angle-Doppler domain by substituting the measured steering vectors into T.

The space-time steering vector for the desired look-direction must be transformed into an angle-Doppler steering vector through the same transformation matrix, $$\tilde{v}(\bar{\omega}, \phi) = T^H v(\bar{\omega}, \phi). \tag{31}$$

In the ideal case, the orthogonality of the columns of the two-dimensional DFT matrix confines the target to a single angle-Doppler bin. The target localization effectively decouples the DOF from the number of antenna element data 160 and pulse data 170. In a real antenna system, the non-orthogonality of the spatial steering vectors causes the target information to spread in angle-space. The number of DOF in this algorithm that suppresses inteference is directly related to the size of LPR 370 established around the target in the angle-Doppler domain. The 3×3 example used here results in nine DOF.

The adaptive weight vector is then computed for LPR 370 by the sample matrix inversion method. Given $$\tilde{R} = \frac{1}{K} \sum_{i=1}^{K} \tilde{\chi}_i \tilde{\chi}_i^H, \tag{32}$$

where K is the number of range cells in the covariance matrix estimate, the adaptive filter is $$\tilde{w} = \tilde{R}^{-1} \tilde{v}. \tag{33}$$

One of the main advantages of this technique is that few DOF are used. Hence the requirements for secondary data support are reduced. Furthermore, the size of LPR 370 is easily changed. This flexibility in the number of DOF and the secondary data support required is very helpful when we apply to a real radar the technique of the present invention.

Since a STAP algorithm can be viewed as a filter matched to a particular angle and Doppler frequency, a STAP algorithm is therefore an adaptive transform to this particular angle and Doppler. Creating a set of look angles and Doppler frequencies allows the algorithm to perform a function similar to the DFT. It must be emphasized that this transformation is non-invertible, resulting in some loss of information. However, this loss may be beneficial, as we take advantage of it to suppress discrete interferers within the range cell of interest through the use of the new direct data domain algorithm.

Figure 10:
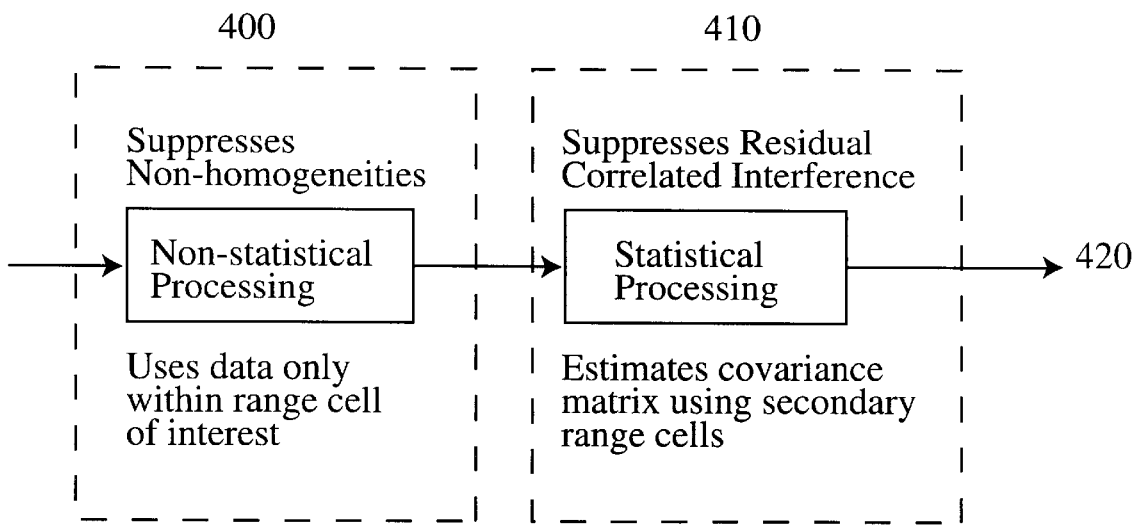
FIG. 10 is a flow chart that shows the two stages of the algorithm of the present invention.

Referring to FIG. 10, the hybrid algorithm of the present invention adaptively processes space-time data in two stages. A first stage 400 is the direct data domain algorithm developed in (24) above. This stage suppresses non-homogeneities that statistical algorithms cannot handle. The output of the first stage lends itself to the application of a post-Doppler, beamspace statistical algorithm forming a second stage 410 of adaptive processing. The enhanced version of the JDL algorithm (see above) becomes the second stage. JDL suppresses correlated interference in LPR 370 of the angle-Doppler domain. Second stage 410 yields a hybrid algorithm output 420 that is applied to threshold detection.

The primary difference between modified JDL and the Two-Stage Hybrid algorithm of the present invention is the transformation matrix used. The hybrid algorithm replaces the components of the transformation matrix T in the modified JDL algorithm with a set of direct data domain algorithm weight vectors. The equation $$T = \begin{bmatrix} w(\bar{\omega}_{-1}, \phi_{-1}) & w(\bar{\omega}_{-1}, \phi_0) & w(\bar{\omega}_{-1}, \phi_1) \\ w(\bar{\omega}_0, \phi_{-1}) & w(\bar{\omega}_0, \phi_0) & w(\bar{\omega}_0, \phi_{-1}) \\ w(\bar{\omega}_1, \phi_{-1}) & w(\bar{\omega}_1, \phi_0) & w(\bar{\omega}_1, \phi_1) \end{bmatrix} \quad (34)$$

illustrates the form for the 3×3 LPR 370 used throughout this application. Replacing the non-adaptive transformation with the adaptive transformation solves the problem of detecting targets in non-homogeneous range cells. It also results in two-stage adaptivity, an approach new to adaptive processing. Second stage 410 is a sample matrix inversion applied within LPR 370.

Because the Two Stage Hybrid algorithm of the present invention operates only within a localized region of the angle-Doppler domain, few DOF are used, and secondary data support requirements are correspondingly reduced. This feature is critical to applying the algorithm to real-world airborne surveillance radars.

We tested the hybrid algorithm of the present invention on data generated using the physical model of A. Jaffer et al. ("Adaptive space-time processing techniques for airborne radars," Contract F30602-89-D-0028, Hughes Aircraft Company, Fullerton, Calif. 92634 (July 1991)) and J. Ward ("Space-Time adaptive processing for airborne radar," Tech. Rep F19628-95-C-0002, MIT Lincoln Laboratory (December 1994)) as implemented by J. R. Roman and D. W. Davis ("Multichannel system identification and detection using output data techniques," Contract C-F30602-93-C-0193, Rome Laboratory/OCSM, 26 Electronic Parkway, Rome, N.Y. 13441-4514 (May 1997)). Comparing adapted beam patterns associated with JDL, the new direct data domain, and the hybrid algorithm of the present invention illustrate the improved performance that results from employing the hybrid algorithm.

The adapted antenna pattern plots we present are the mean pattern derived from over 200 independent trials. Vertical bars represent the standard deviation over these 200 trials.

As the direct data domain algorithm is non-statistical and based solely on a single data set/realization, we could not operate with known covariance to obtain an ideal pattern as in JDL or other statistical algorithms.

The simulation includes the effects of clutter, white noise, two barrage noise jammers, and a discrete interferer. The simulated antenna array is linear with N=18 elements and a CPI of M=18 pulses. Two 40 dB jammers are located at 45° and −20°. The discrete interferer is simulated by an injected 40 dB target at the same normalized Doppler as the look-Doppler but at a different azimuth angle of $\phi=-51°$. The look direction is set to an azimuth angle of $\phi=0°$ and normalized Doppler $\bar{\omega}_t=\frac{1}{3}$. The second stage uses three angles and three Doppler frequencies centered on the look direction for nine total DOF. The number of secondary data vectors used to estimate the covariance matrix is set to 18, or twice the DOF.

Figure 11:
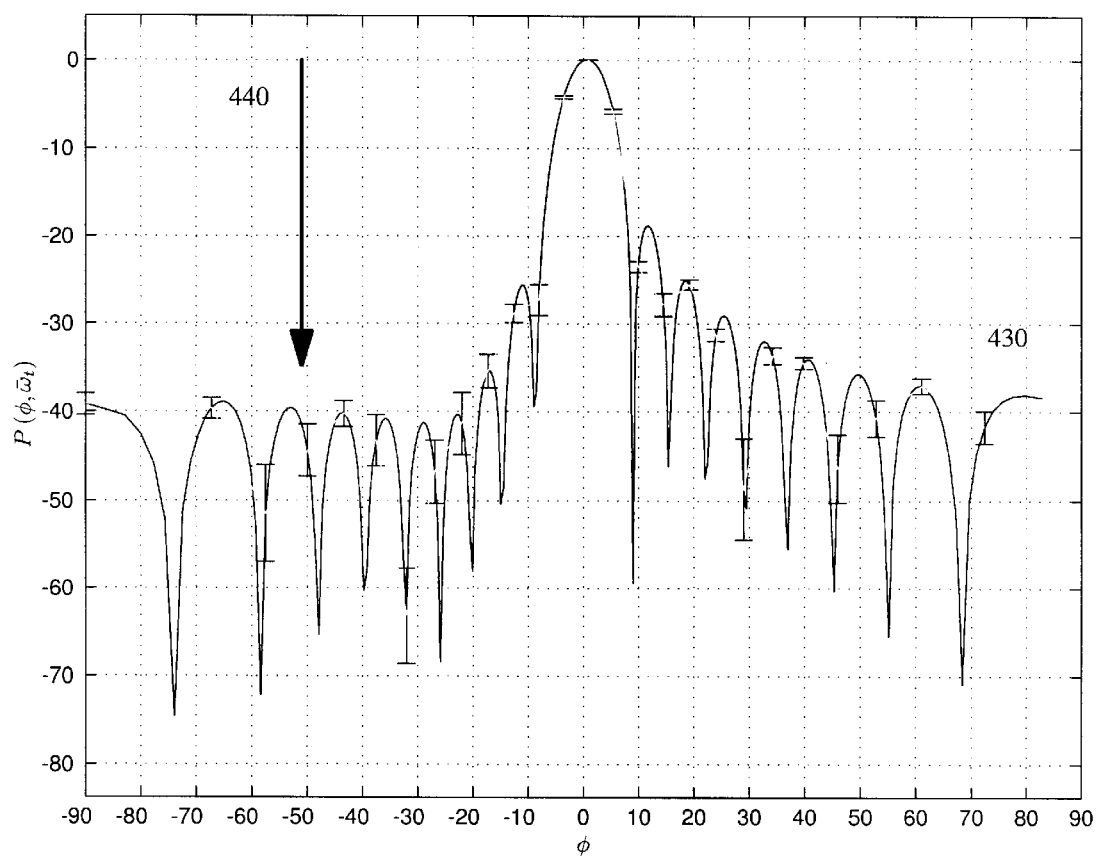
FIG. 11 shows the antenna azimuth response for the standard JDL algorithm with a discrete interferer present.
Figure 12:
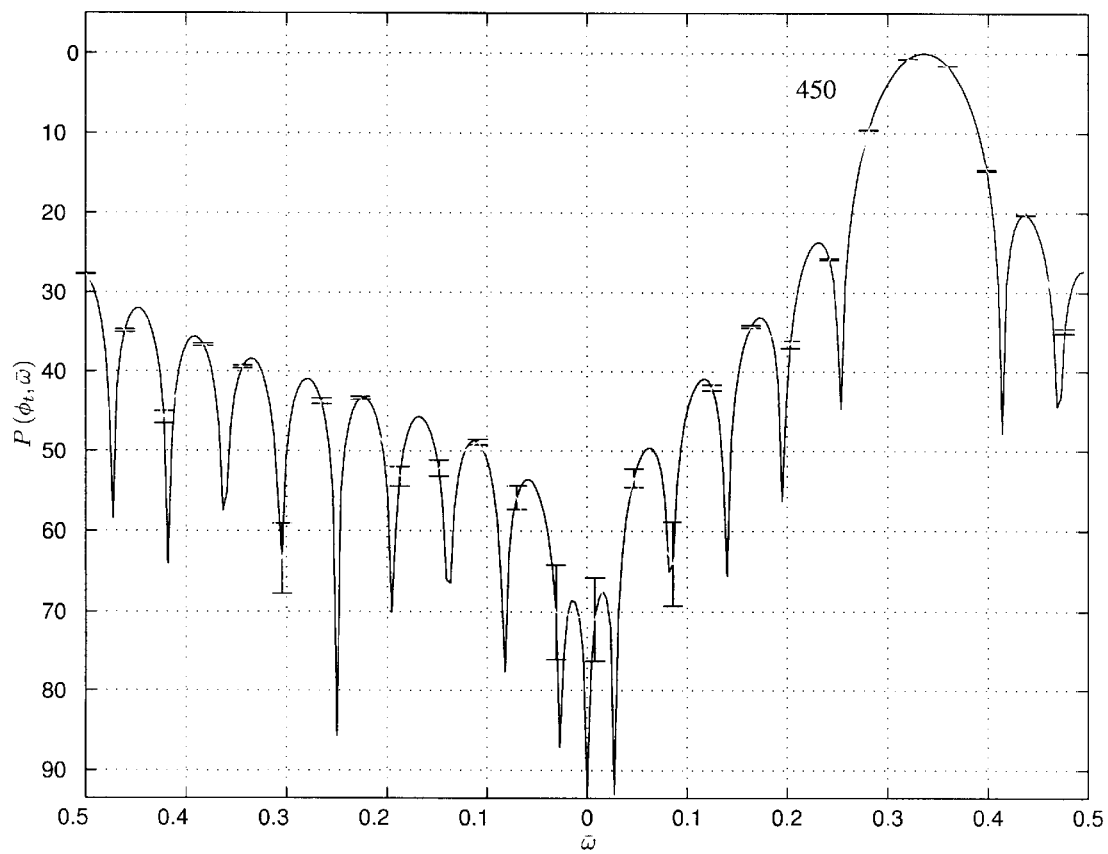
FIG. 12 shows the antenna Doppler response for the standard JDL algorithm with a discrete interferer present.

FIGS. 11 and 12 illustrate the antenna patterns for the standard JDL algorithm along target azimuth and Doppler. FIG. 11 shows the algorithm has placed distinct nulls in the two jammer locations. These nulls occur at −20° and 45° along a graph of an adapted azimuth antenna pattern 430. A discrete interferer 440, i.e., off-azimuth target, does not contribute to the covariance matrix estimate and is therefore not nulled by the algorithm. The antenna pattern peak occurring at the location of discrete interferer 440 indicates this lack of suppression. FIG. 12 shows the Doppler response of the JDL algorithm. The pattern, indicated by a graph of a JDL adapted Doppler antenna pattern 450, shows a null at $\omega=0$ to suppress mainlobe clutter. The mainlobe is at the Doppler look direction of $\bar{\omega}_t=\frac{1}{3}$.

Figure 13:
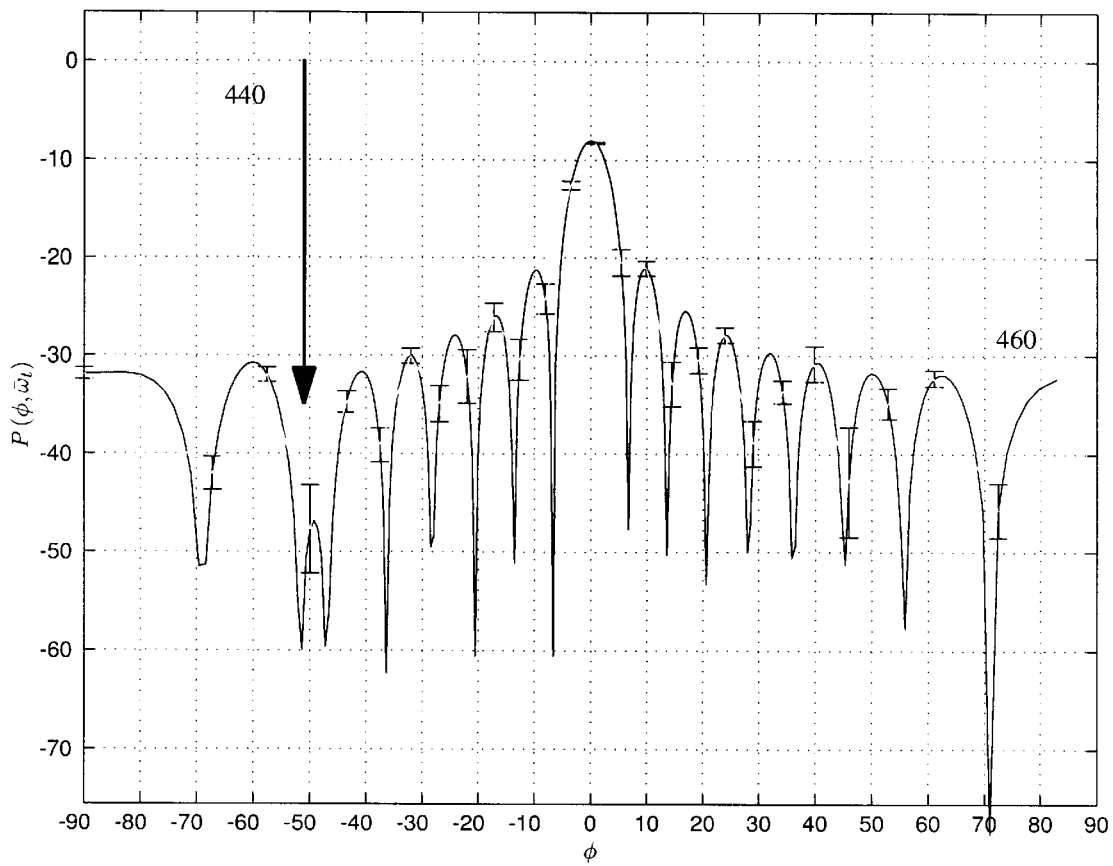
FIG. 13 shows the antenna azimuth response from implementing the two-dimensional direct data domain algorithm with a discrete interferer present.
Figure 14:
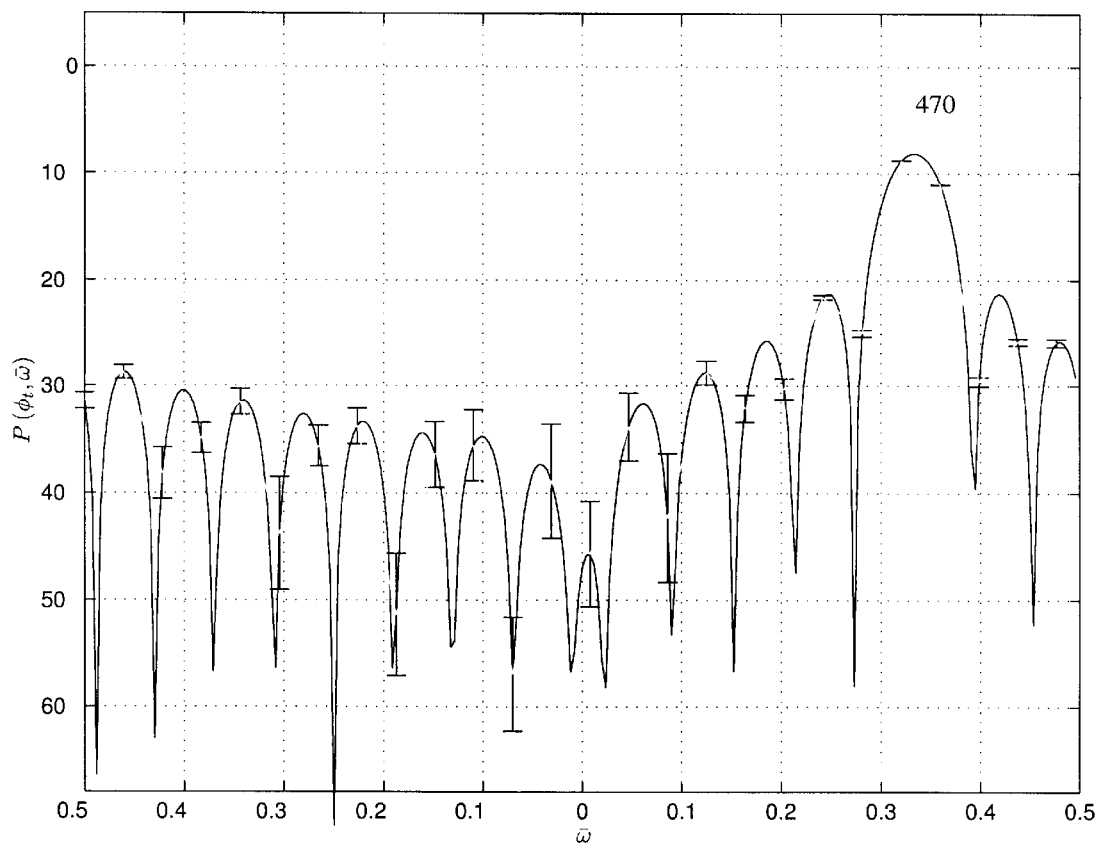
FIG. 14 shows the antenna Doppler response from implementing the two-dimensional direct data domain algorithm with a discrete interferer present.

FIGS. 13 and 14 present the antenna patterns that result from implementing the two-dimensional direct data domain algorithm. A direct data domain algorithm uses data only from the range cell of interest; hence it does not require any secondary data. FIG. 13 shows the direct data domain algorithm countering discrete interferer 440 in the range cell of interest. An adapted azimuth antenna pattern 460 shows a distinct null in the direction of discrete interferer 440 at −51°.

However, FIGS. 13 and 14 also illustrate the limitations of the direct data domain algorithm. The nulls in the direction of the jammers are not as deep as in FIG. 11. In FIG. 14, the null at ($\omega=0$ in an adapted Doppler antenna pattern 470 (algorithm Doppler response) is also not as deep, i.e., the mainbeam clutter is not suppressed as effectively as by the JDL algorithm.

The results shown in FIGS. 11–14 demonstrate the need for the hybrid algorithm of the present invention. The direct data domain algorithm becomes the first stage, screening out discrete interferers. A statistical algorithm, such as JDL, then suppresses residual correlated interference.

Figure 15:
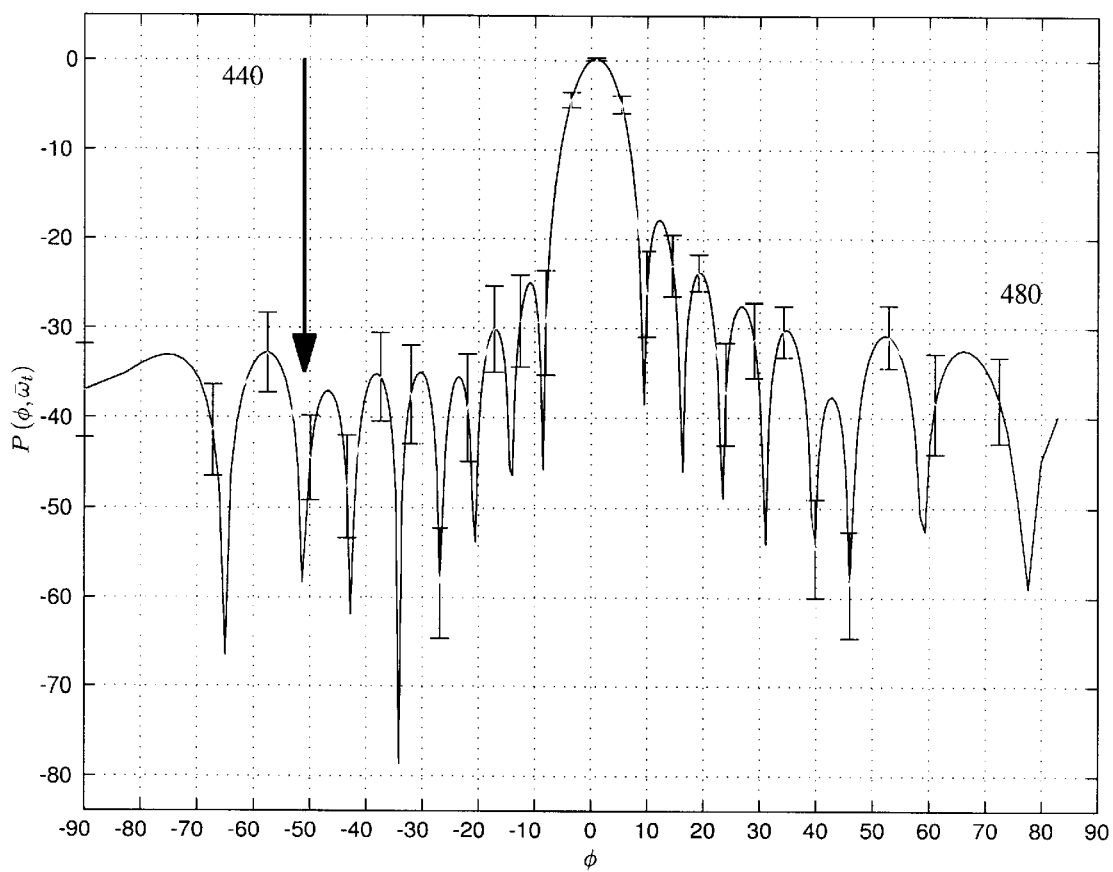
FIG. 15 shows the antenna azimuth response for the hybrid algorithm of the present invention with a discrete interferer present.
Figure 16:
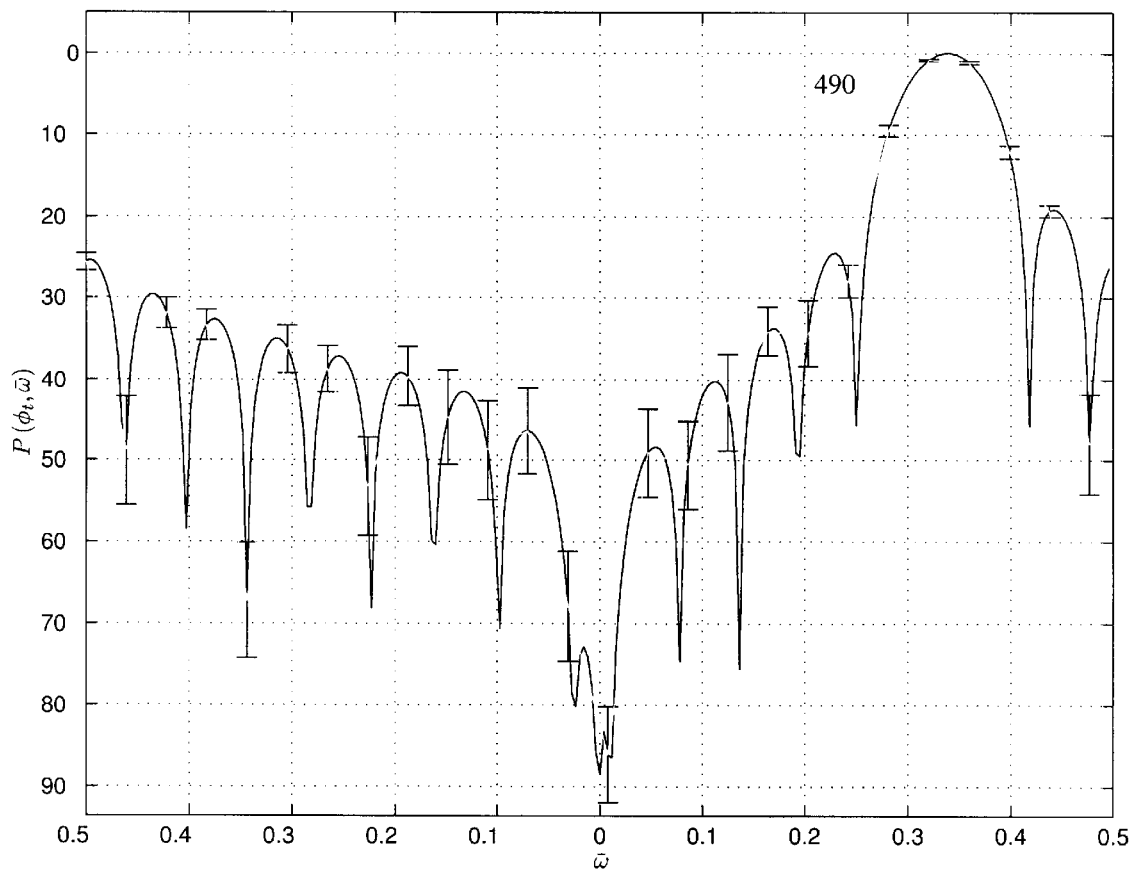
FIG. 16 shows the antenna Doppler response for the hybrid algorithm of the present invention with a discrete interferer present.

FIGS. 15 and 16 show the antenna beam patterns resulting from the use of the hybrid algorithm of the present invention. FIG. 15 shows how the hybrid algorithm combines the advantages of both statistical and non-statistical adaptive processing. An adapted azimuth antenna pattern 480 shows deep nulls at −51°, −20° and 45°; the directions of discrete interferer 440 and the two jammers. FIG. 16 shows an adapted Doppler antenna pattern 490 has a deep null at $\phi=0$ that effectively nulls the mainbeam clutter.

A second example uses data from the Multi-Channel Airborne Radar Measurement (MCARM) program (D. Sloper et al., "Multi-channel airborne radar measurement (MCARM), MCARM flight test," Contract F30602-92-C-0161, Westinghouse Electronic Systems (April 1996)). This program collected data from an airborne radar specifically or the testing of STAP algorithms. Because this is real airborne radar data, the true effects of clutter, terrain variations, antenna element mismatches and mutual coupling, and many other real-world problems exist and must each be accounted for.

Figure 17:
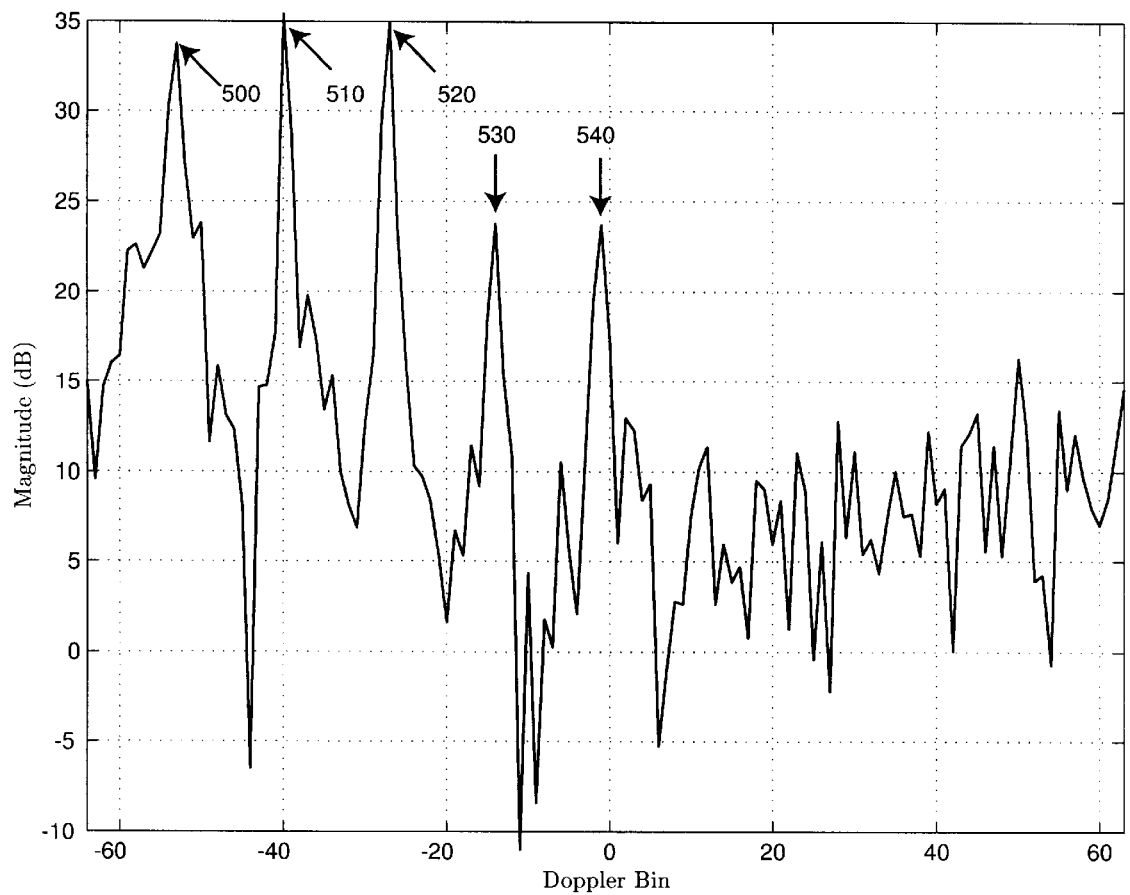
FIG. 17 shows the results of applying the modified JDL algorithm to data from the Multi-Channel Airborne Radar Measurement ("MCARM") program.

The data set chosen for this example includes a moving target simulator. The simulator was located on the ground and consisted of five tones spaced approximately 200 Hz apart. These tones are shown by the output of the modified JDL algorithm in FIG. 17. The modified JDL algorithm was matched to the moving target simulator's angle within the data set. To find the tones and produce the plot shown, the algorithm was swept across the entire Doppler range for the radar, in this case 128 Doppler bins (there are 128 pulses within the data set). The arrows in FIG. 17 indicate each of five tones 500, 510, 520, 530, and 540. This target simulator served as the discrete non-homogeneity for testing the present invention.

Figure 18:
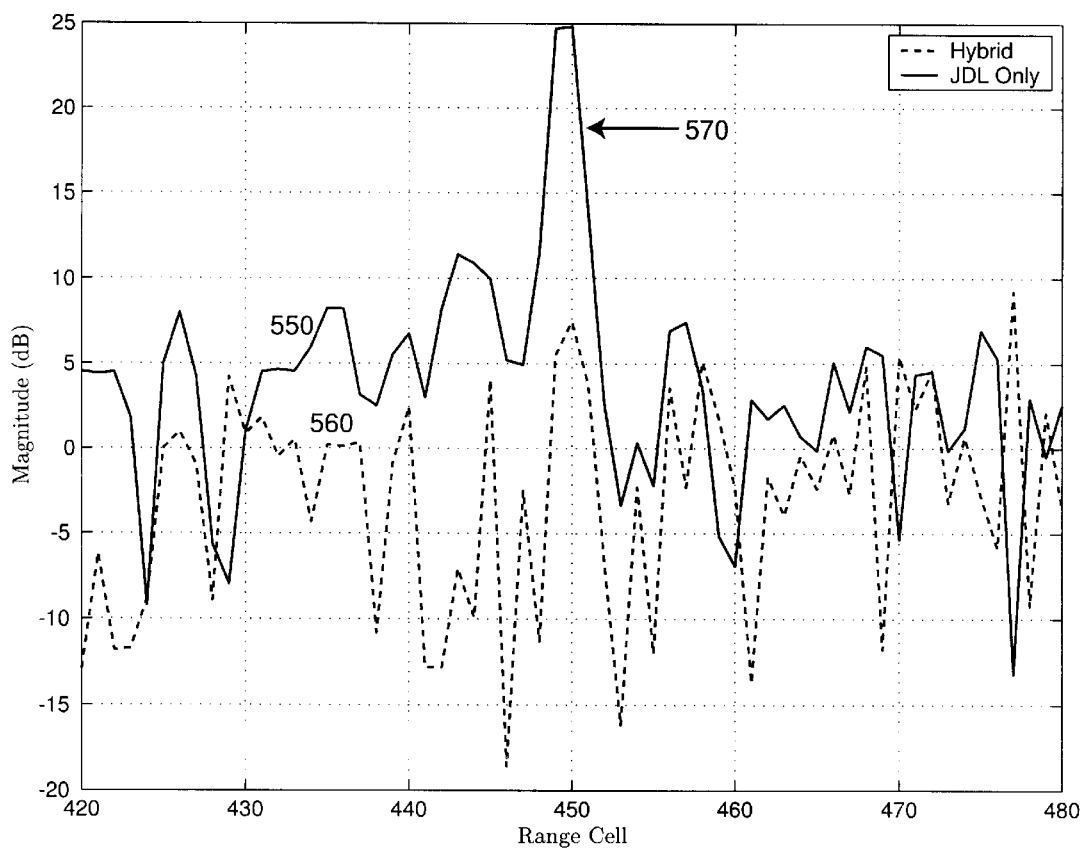
FIG. 18 compares an output from the present invention to an output from the JDL algorithm before injection of a weak target.

Injecting a weak target at an angle far from the moving target simulator tested the present invention. The angle chosen was bin 85; the moving target simulator is located at bin 57. FIG. 18 compares an output 560 from the present invention and an output 550 from the JDL algorithm before injection of the weak target. The JDL algorithm clearly shows a large false alarm 570 at the range cell corresponding to the location of the moving target simulator range cell. The hybrid algorithm of the present invention did not produce the false alarm. This result confirms the performance of the present invention at suppressing the discrete interferer (the moving target simulator).

Figure 19:
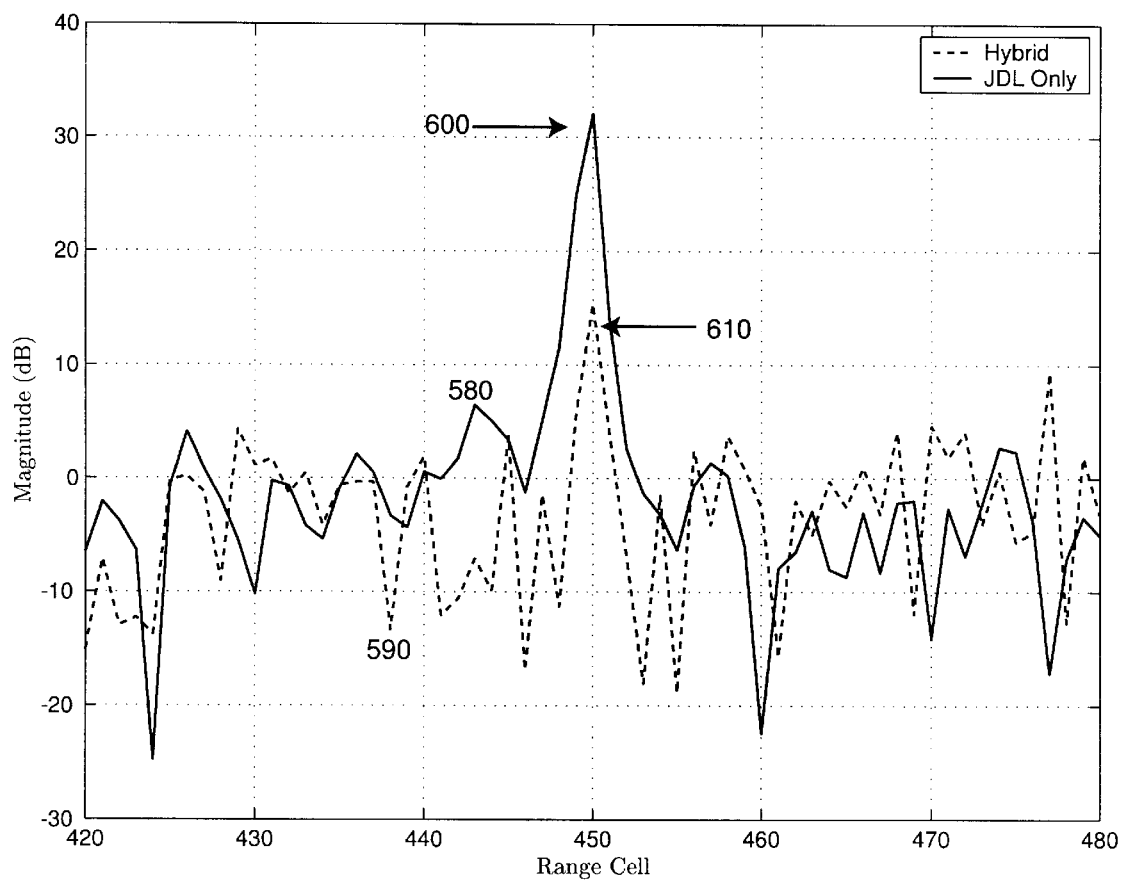
FIG. 19 compares an output from the present invention to an output from the JDL algorithm when the weak target is injected.

FIG. 19 shows the output of the two test algorithms when the weak target is injected. A graph 580 of JDL output clearly shows a detected target 600. But, because we could view the output of this algorithm with no injected target, we know this detection is due to the moving target simulator and not the injected target. We have no confidence that a true target exists at this range cell and angle. However, examining a graph 590 of the hybrid algorithm output of the present invention shows a clear target 610. There is high confidence in this target detection because of the algorithm's ability to suppress discrete interferers.

Figure 20:
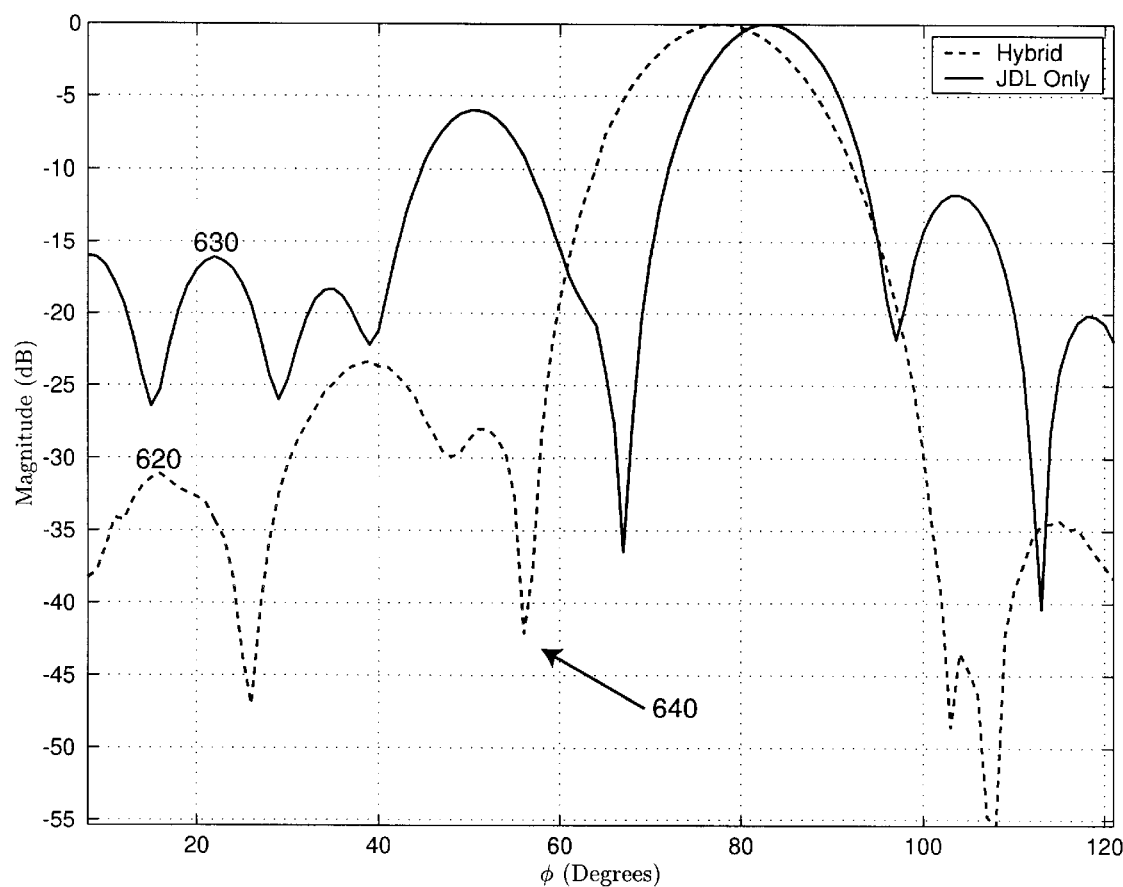
FIG. 20 compares the azimuthal responses of the present invention and the JDL algorithm.

Referring to FIG. 20, comparing the antenna patterns for the two algorithms confirms the present invention's improved performance. An antenna pattern 620 for the present invention has a large null at the location of a discrete interferer 640, a.k.a. moving target simulator. An antenna pattern 630 from the standard JDL algorithm does not null the interferer, resulting in false alarm 570 shown in FIG. 18.

For the present invention, we have developed two new algorithms: (1) a two-dimensional non-statistical STAP algorithm and (2) a hybridization of this algorithm with a statistically based post-Doppler algorithm. The non-statistical algorithm allows filtering of discrete interferers within the range cell of interest. However, performance of direct data domain algorithms in the presence of homogeneous correlated interference is inferior to traditional statistical STAP algorithms.

The proposed hybrid algorithm overcomes this drawback by implementing a second stage of statistical adaptive processing. FIGS. 11 through 20 illustrate the advantages of a two-stage adaptive process that combines direct data domain and statistical algorithms. The direct data domain method is particularly effective at countering non-homogeneous clutter. The statistical STAP algorithm then improves suppression of correlated interference.

We have emphasized radar applications above. The need for adaptive techniques compatible with multi-channel wireless radio frequency communications warrants further discussion.

As the number of wireless radio frequency communications transceivers increases, so does the need for sophisticated rejection of co-channel interference. At present, the wireless industry depends on coding techniques to separate signals that correspond to different users. With a strong demand for additional capacity, migration to multi-channel, multi-band digital radio frequency communications is essential. In multi-channel wireless radio frequency communications that operate under ideal conditions, adaptivity in the time (or frequency) domain is of little interest. But the demand for spatial adaptivity is very high, because of electromagnetic interference from other emitters that operate within line-of-sight (and in-band) as well as from multipath effects.

The present invention addresses the mitigation of sporadic electromagnetic interference and permits dramatic increases in channel capacity of commercial communications equipment. Though electromagnetic interference can be mitigated through dynamic channel assignment, it usually reduces capacity. A 10% increase in channel capacity translates to $5.9 billion in additional revenue (10% of the current $59 billion annual wireless radio frequency communications market). We estimate that multichannel adaptive processing in both space and time domains could translate into an increase in signal density by a factor of 10 or more! Thus adapting the present invention to wireless communication promises more efficient use of the electromagnetic spectrum with tremendous savings.

Also, the present invention can be combined with waveform diversity, the subject of U.S. patent application Ser. No. 09/330,928 filed Jun. 11, 1999, by M. C. Wicks, S. Bolen, and R. Brown, the disclosure of which is incorporated herein by reference. Combining the hybrid STAP algorithm of the present invention with waveform diversity can lead to secure communications in an electromagnetically dense signal environment that is of high commercial value.

We have demonstrated above the effectiveness of the present invention using measured multi-channel, multi-pulse radar data However, the present invention applies directly to any multi-channel system designed to mitigate electromagnetic interference and multipath effects, independent of the application (radar or communications).

There are no other methods currently available to detect a target within a non-homogeneous range cell.

There are two features of the present invention that are new. The first is the two-dimensional direct data domain algorithm. All previous attempts at direct data domain algorithms focus on a single dimension, which have proven inadequate.

The use of multiple-stage adaptive processing in the invention is also new.

One of the most important alternative applications of the present invention is in Knowledge Based STAP ("KB-STAP"). One approach to KB-STAP involves testing data for homogeneity first. For homogeneous range cells, i.e., interference statistics are identically distributed, the processor would apply a standard STAP technique. However, the present invention now shows how to detect targets within non-homogeneous range cells.

There are alternative embodiments of the present invention. The first stage serves as a transform to reach the angle-Doppler domain. This transform can be non-adaptive, as in standard JDL. However, we have developed an adaptive transform to increase suppression of interference for the residual correlated clutter. The transform we have developed can be replaced by any adaptive transform to the angle-Doppler domain, thereby gaining different advantages. The two-dimensional direct data domain algorithm of the present invention was chosen to suppress interference within the range cell of interest, but alternatives are possible.

Another embodiment would replace the post-Doppler technique we use here with a different one.

Clearly many modifications and variations of the present invention are possible in light of the above teachings. It should therefore be understood that, within the scope of the inventive concept, the invention may be practiced otherwise than as specifically claimed.

What is claimed is:

1. Apparatus for adaptive signal processing, which comprises:
   a receiver effective for receiving a plurality of signals;
   a signal processor effective for adaptively transforming said plurality of signals into a plurality of samples;
   said plurality of samples comprising a cell under test and related secondary cells;
   said signal processor being further effective for a first transformation of said cell under test and said related secondary cells from a spatial-temporal domain to a look-angle Doppler domain;
   said look-angle Doppler domain comprising a plurality of points; and
   said signal processor being further effective for a second transformation of said plurality of points to mitigate electromagnetic interference and clutter that masks desired returns.

2. Apparatus as in claim 1, wherein said first transformation applies a direct data domain least-squares algorithm.

3. Apparatus as in claim 2, wherein said first transformation suppresses discrete interferers.

4. Apparatus as in claim 2, wherein said first transformation maximizes a difference between desired signal power and interference power in a chosen look-angle Doppler direction.

5. Apparatus as in claim 1, wherein said second transformation applies a sample matrix inversion or its equivalent.

6. Apparatus as in claim 5, wherein said second transformation suppresses distributed interference.

7. Apparatus as in claim 5, wherein said second transformation employs a steering vector associated with a chosen look-angle Doppler direction.

8. Apparatus as in claim 1, wherein said receiver and said signal processor comprise a radar system.

9. Apparatus as in claim 8, wherein said radar system is mobile.

10. Apparatus in claim 9, wherein said system is a phased-array, pulsed-Doppler radar.

11. Apparatus as in claim 1, wherein said receiver and said signal processor comprise a digital communications system.

12. A method of adaptive signal processing comprising the steps of:
    selecting at least one primary cell from a plurality of signals by spatially and temporally sampling from said plurality;
    sequentially choosing a main angle-look direction and a main Doppler in relation to said at least one primary cell;
    forming a steering vector based on said angle-look direction and said Doppler;
    computing, for said at least one primary cell, a first set of adaptive weights based on said steering vector;
    applying said first set of adaptive weights to signals in said at least one primary cell to form a primary localized processing region ("LPR");
    selecting from said plurality of signals a set of secondary cells associated with said at least one primary cell;
    further applying said first set of adaptive weights to said set of secondary cells to form a plurality of secondary LPRs and to convert said steering vector to a LPR steering vector;
    estimating, from first interference statistics of said plurality of secondary LPRs, second interference statistics for said primary LPR;
    computing a second set of adaptive weights from said second interference statistics and said LPR steering vector;
    still further applying said second set of adaptive weights to said primary LPR; and
    comparing a result from said step of still further applying to a threshold value to determine presence or absence of a desired signal.

13. The method of claim 12, wherein said plurality of signals includes desired returns from targets and undesired interference.

14. The method of claim 13, wherein said interference further comprises at least one of
    returns from said targets at non-chosen look directions and non-chosen Dopplers, clutter, and
    any other electromagnetic energy capable of masking at least one of said targets.

15. Apparatus for adaptive signal processing, which comprises:
    first selection means for selecting at least one primary cell from a plurality of signals by spatially and temporally sampling from said plurality;
    means for sequentially choosing a main angle-look direction and a main Doppler in relation to said at least one primary cell;
    means for forming a steering vector based on said angle-look direction and said Doppler;
    first computing means for computing, for said at least one primary cell, a first set of adaptive weights based on said steering vector;
    first application means for applying said first set of adaptive weights to signals in said at least one primary cell to form a primary localized processing region ("LPR");
    second selection means for selecting from said plurality of signals a set of secondary cells associated with said at least one primary cell;
    second application means for applying said first set of adaptive weights to said set of secondary cells to form a plurality of secondary LPRs and to convert said steering vector to a LPR steering vector;
    means for estimating, from first interference statistics of said plurality of secondary LPRs, second interference statistics for said primary LPR;
    second computing means for computing a second set of adaptive weights from said second interference statistics and said LPR steering vector;
    third application means for applying said second set of adaptive weights to said primary LPR; and
    means for comparing a result from said third application means to a threshold value to determine presence or absence of a desired signal.

16. Apparatus as in claim 15, wherein said plurality of signals includes desired returns from targets and undesired interference.

17. Apparatus as in claim 16, wherein said interference further comprises at least one of
   returns from said targets at non-chosen look directions and non-chosen Dopplers, clutter, and
   any other electromagnetic energy capable of masking at least one of said targets.

18. Apparatus as in claim 15, wherein said steering vector can be measured, calculated, or theoretically constructed.

19. Apparatus as in claim 1, wherein said receiver and said signal processor comprise a sonar system.

20. Apparatus as in claim 1, wherein said receiver and said signal processor comprise a seismic wave detection system.

* * * * *